United States Patent
Oishi et al.

(10) Patent No.: US 8,313,246 B2
(45) Date of Patent: Nov. 20, 2012

(54) ROCKER BEARING WITH OUTER RING AND AIR DISK BRAKE SYSTEM

(75) Inventors: Shinji Oishi, Iwata (JP); Haruki Yamada, Hamamatsu (JP); Akihiko Katayama, Kikugawa (JP)

(73) Assignee: NTN Corporation, Osaka (JP)

( * ) Notice: Subject to any disclaimer, the term of this patent is extended or adjusted under 35 U.S.C. 154(b) by 571 days.

(21) Appl. No.: 12/312,067

(22) PCT Filed: Oct. 18, 2007

(86) PCT No.: PCT/JP2007/070359
§ 371 (c)(1),
(2), (4) Date: Apr. 24, 2009

(87) PCT Pub. No.: WO2008/050671
PCT Pub. Date: May 2, 2008

(65) Prior Publication Data
US 2010/0054648 A1    Mar. 4, 2010

(30) Foreign Application Priority Data

Oct. 26, 2006 (JP) .................. 2006-291493
Oct. 26, 2006 (JP) .................. 2006-291494
Nov. 6, 2006 (JP) .................. 2006-300245
Nov. 21, 2006 (JP) .................. 2006-313822
Nov. 30, 2006 (JP) .................. 2006-323274
Dec. 4, 2006 (JP) .................. 2006-326667

(51) Int. Cl.
*F16C 33/58* (2006.01)

(52) U.S. Cl. .................. 384/569; 384/548; 384/572

(58) Field of Classification Search ............... 384/548, 384/572, 573, 577, 578, 580, 569, 2
See application file for complete search history.

(56) References Cited

U.S. PATENT DOCUMENTS

| | | | |
|---|---|---|---|
| 3,306,682 A | | 2/1967 | Cowles |
| 5,879,086 A | * | 3/1999 | Muntnich et al. ............. 384/621 |
| 6,102,580 A | * | 8/2000 | Alling et al. .................. 384/618 |
| 7,517,156 B2 | * | 4/2009 | Kazama ....................... 384/569 |
| 7,603,929 B2 | * | 10/2009 | Ichikawa et al. ............. 384/569 |
| 7,682,087 B2 | * | 3/2010 | Okugami et al. ............. 384/569 |
| 2006/0067597 A1 | * | 3/2006 | Oishi ............................ 384/572 |
| 2006/0110082 A1 | * | 5/2006 | Tvaruzek ......................... 384/2 |

(Continued)

FOREIGN PATENT DOCUMENTS
CN    1611628 A    5/2005
(Continued)

*Primary Examiner* — Victor MacArthur
*Assistant Examiner* — Matthew R McMahon
(74) *Attorney, Agent, or Firm* — Clark & Brody

(57) ABSTRACT

An outer ring for rocking bearing (11a) includes a raceway surface (12a) on the inner diameter side and has flange parts (13a) and (13b) provided by bending both axial ends to the inner diameter side. The flange parts (13a) and (13b) are provided with bent parts (17a) and (17b) axially bent toward the raceway surface (12a) side so as to enfold a retainer arranged on the inner diameter side. Thus, the retainer can be enfolded by the bent parts (17a) and (17b). Therefore, even when the retainer comes to be moved to the inner diameter side of the outer ring for rocking bearing (11a), the retainer is caught by the bent parts (17a) and (17b), so that the movement of the retainer to the inner diameter side is restricted and rollers and the retainer can be prevented from dropping off.

28 Claims, 19 Drawing Sheets

U.S. PATENT DOCUMENTS

| | | | |
|---|---|---|---|
| 2007/0053621 A1* | 3/2007 | Kazama | 384/572 |
| 2009/0050091 A1* | 2/2009 | Watanabe et al. | 384/548 |
| 2010/0324195 A1* | 12/2010 | Williamson | 524/445 |

FOREIGN PATENT DOCUMENTS

| | | |
|---|---|---|
| DE | 1 254 408 | 11/1967 |
| DE | 196 46 338 | 5/1998 |
| EP | 1 566 557 | 8/2005 |
| EP | 1 614 914 | 1/2006 |
| EP | 1 707 831 | 10/2006 |
| JP | 58-20735 | 2/1983 |
| JP | 61-38214 | 2/1986 |
| JP | 1-168016 | 7/1989 |
| JP | 8-504250 | 5/1996 |
| JP | 2001-187921 | 7/2001 |
| JP | 2002-180203 | 6/2002 |
| JP | 2003-206933 | 7/2003 |
| JP | 2003-214330 | 7/2003 |
| JP | 2005-291416 | 10/2005 |
| JP | 2006-022820 | 1/2006 |
| JP | 2006-022934 | 1/2006 |
| JP | 2006-145012 | 6/2006 |
| WO | 2005/035814 | 4/2005 |
| WO | 2006/002905 | 1/2006 |
| WO | 2006/013696 | 2/2006 |
| WO | 2006/098276 | 9/2006 |

* cited by examiner

ROCKER BEARING WITH OUTER RING AND AIR DISK BRAKE SYSTEM

TECHNICAL FIELD

The present invention relates to an outer ring for a rocking bearing, a retainer for a rocking bearing, a rocking bearing, and an air disk brake system.

BACKGROUND ART

An air disk brake system using compressed air is employed in a large-sized commercial motor vehicle such as a track and a bus. Here, a brief description will be made of a constitution of a general air disk brake system. FIG. 40 is a schematic sectional view showing the constitution of the general air disk brake system. Referring to FIG. 40, an air disk brake system 101 includes a brake cylinder (not shown) having an actuator rod 102, a lever 103 connected to one end of the actuator rod 102, a rotation member 104 connected to the other end of the lever 103, a rocking bearing 105 rotatably supporting the rotation member 104, a connection part 107 provided at an eccentric position with respect to the rotation member 104, a traverse 106 having one end connected to the connection part 107, right and left brake pads (not shown) working with the traverse 106, and a rotor (not shown) arranged between the right and left brake pads. According to the air disk brake system 101, the rotor is sandwiched by the right and left brake pads by use of the compressed air supplied from the brake cylinder through the lever 103 and the like.

In addition, such air disk brake system is disclosed in Japanese National Publication PCT application No. 8-504250 and WO2006/002905A1.

A brief description will be made of a constitution of the rocking bearing in the above air disk brake system. The rocking bearing has an outer ring for the rocking bearing, a plurality of rollers, and a retainer to retain the rollers. The outer ring for the rocking bearing is not in the form of a ring, and it is provided by splitting a cylindrical member at two circumferential points. The retainer also has a configuration provided by splitting a cylindrical member at two circumferential points and following the outline of the outer ring for the rocking bearing. When the rocking bearing having the above constitution is assembled, the rollers are incorporated in pockets of the retainer first, and the retainer having the rollers is arranged on the inner diameter side of the outer ring for the rocking bearing.

Here, after the rocking bearing has been assembled, the movement of the retainer toward the inner diameter side is not restricted. Thus, when the assembled rocking bearing is mounted on the air disk brake system having the above constitution, the retainer could be moved toward the inner diameter side and drop out of the outer ring for the rocking bearing.

DISCLOSURE OF THE INVENTION

It is an object of the present invention to provide an outer ring for a rocking bearing in which rollers and a retainer are prevented from dropping off.

It is another object of the present invention to provide a rocking bearing having high assembling properties.

It is still another object of the present invention to provide an air disk brake system having high productivity.

An outer ring for a rocking bearing according to the present invention includes a raceway surface on the inner diameter side and has a flange part provided by bending axial each axial end to the inner diameter side. Here, at least one the flange part is provided with a bent part axially bent toward the raceway surface side so as to enfold a retainer arranged on the inner diameter side.

In this constitution, at the time of assembling of the rocking bearing, when the retainer having the rollers is arranged on the inner diameter surface of the outer ring for the rocking bearing, the retainer can be enfolded by the bent part. Thus, even when the retainer comes to be moved toward the inner diameter side of the outer ring for the rocking bearing, the retainer is caught by the bent part, so that the movement of the retainer toward the inner diameter side can be restricted. Thus, the rollers and retainer can be prevented from dropping out of the outer ring for the rocking bearing.

Preferably, the bent part is provided so as to be continued in a circumferential direction of the flange part. Thus, since the retainer can be enfolded over the wide range in the circumferential direction, the retainer and the roller can be prevented from dropping off more surely.

Further preferably, the bent part is provided along each flange part. Thus, the retainer can be held by the bent part provided on each flange part. Thus, the rollers and retainer can be prevented from dropping out of the outer ring for the rocking bearing more surely.

Further preferably, a material containing 0.15 to 1.1% by weight of carbon is subjected to a carbonitriding treatment to produce the outer ring for the rocking bearing. Thus, high-strength outer ring for the rocking bearing can be produced at low cost. Since the outer ring for the rocking bearing has high load capacity, it is hardly damaged. In addition, since the strength of the bent part is also high, the retainer and the rollers can be prevented from dropping off more surely.

In addition, the material of the outer ring for the rocking bearing may contain 0.5 to 1.1% by weight of carbon. According to the above constitution, processability is improved, and its outline configuration can be formed with high accuracy by a pressing process. In addition, even when the carbonitriding treatment is not performed, hardness required for the outer ring for the rocking bearing can be provided. Thus, the outer ring for the rocking bearing can be prevented from being deformed at the time of heat treatment. Therefore, the outer ring for the rocking bearing is high in accuracy, low in cost, and high in load capacity.

Further preferably, the outer ring for the rocking bearing containing 0.5 to 1.1% by weight of carbon is subject to a bright quenching treatment. In addition, the outer ring for the rocking bearing containing 0.5 to 1.1% by weight of carbon may be subject to a high-frequency quenching treatment. The above heat treatments can be performed at low cost.

According to another aspect of the present invention, a rocking bearing includes a plurality of rollers arranged on the raceway surface, a retainer containing pockets to hold the rollers and a pair of connection parts positioned on each axial end of the pockets and continued in a circumferential direction, and any one of the outer rings for the rocking bearing described above.

According to the rocking bearing, the rollers and the retainer are prevented from dropping out of the outer ring for the rocking bearing. In addition, at the time of assembling, since the retainer and the outer ring for the rocking bearing are prevented from being separated or shifted, a mounting defect can be also prevented. Therefore, the assembling properties can be improved.

Preferably, an engagement part engaging with the bent part is provided at the connection part. Thus, when the bent part engages with the engagement part, the retainer and the roller can be more surely prevented from dropping off, and the assembling properties can be further improved.

Further preferably, the outer ring for the rocking bearing and/or the roller have a nitride enrichment layer, and an austenite grain size number exceeding 10, and contains 11% to 25% by volume of retained austenite, and 0.1% to 0.7% by weight of nitrogen.

When the roller bearing such as the rocking bearing is reduced in size, the problem is that an applied load per unit area is increased and the life is shortened. Therefore, it is inevitable that the life is shortened when the roller bearing is reduced in size.

Here, when the austenite grain of the above bearing member is miniaturized such that its grain size number exceeds 10, the rolling fatigue life can be considerably elongated. When the austenite grain size number is not more than 10, since the rolling fatigue life is not sufficiently elongated, the number should be more than 10. In general, it is to be not less than 11. In addition, an average grain size may be not more than 6 μm. A finer austenite grain size is better, but it is difficult to get the grain size number exceeding 13 in general. The above austenite grain size may be found by a normal method defined in JIS or may be calculated by finding an average grain size corresponding to the grain size number by a section method.

In addition, the austenite grain is not changed even in a surface layer having a nitrogen enrichment layer, and in the inner side thereof. Therefore, the grain size number is to be within the above range at the surface layer and its inner side. Here, the austenite grain is the phase-transformed austenite grain during the quenching treatment, which means that it remains as a past history even after transformed to martensite.

In addition, when the retained austenite is less than 11% by volume, the surface damage life is considerably lowered, and when the retained austenite is more than 25% by volume, an aging length change deteriorates because there is no difference from the retained austenite volume when the normal carbonitriding treatment is performed.

The retained austenite volume is a value at a surface layer of 50 μm from a rolling surface after ground, and can be measured by comparing the diffraction intensity of martensite α (211) with that of retained austenite γ (220). As another example, it can be measured by finding magnetization force by a magnetic scale, using the fact that an austenite phase is a nonmagnetic body and a ferrite phase is a ferromagnetic body. Or, it can be easily measured by use of a commercially available measurement device.

The nitrogen enrichment layer is a layer in which a nitrogen content is increased, and formed in a surface layer by the carbonitriding treatment or the nitriding treatment. When the nitrogen content of the nitrogen enrichment layer is less than 0.1% by weight, there is no effect, and the surface damage life is shortened especially. Meanwhile, the nitrogen content is more than 0.7% by weight, a void is generated and hardness is not provided because of too many retained austenite, whereby the life is shortened. The nitrogen content of the nitrogen enrichment layer is a value at 50 μm of the surface layer from the rolling surface after ground, and it can be measured by EPMA (Electron Probe Micro-Analysis: wavelength-dispersive X-ray microanalyzer).

As described above, according to this constitution, the rocking bearing containing the above outer ring for the rocking bearing and the rollers can have a long life.

Further preferably, a snap fitting allowable configuration part to allow snap fitting is provided in the retainer and/or the bent part so that the retainer is retained by the bent part after passing through the bent part.

According to this constitution, when the retainer is held by the bent part of the outer ring for the rocking bearing through the bent part, the retainer is snap-fit in the outer ring for the rocking bearing by the snap fitting allowable configuration provided at the retainer and/or the bent part, and the retainer can be held by the bent part of the outer ring for the rocking bearing. Since the bent part holds the retainer so as to enfold it, the retainer can be prevented from being separated from the outer ring for the rocking bearing. In addition, since the snap fitting allowable configuration part uses elastic deformation of the retainer and the outer ring for the rocking bearing, when the retainer is assembled in the outer ring for the rocking bearing, it can be easily fit in without needing strong force. In addition, at the time of assembling, the retainer and the outer ring for the rocking bearing can be prevented from being damaged. Therefore, the assembling properties of the rocking bearing are improved.

Further preferably, the snap fitting allowable configuration includes a fitting click axially projecting from the end face of the connection part. Thus, the snap fitting can be implemented by use of the fitting click projecting in the axial direction.

Further preferably, a corner part of the fitting click is chamfered on the outer diameter side. Thus, the snap fitting can be implemented by use of the chamfered part of the fitting click. Thus, the snap fitting can be implemented smoothly. Therefore, the assembling properties can be further improved.

Further preferably, a corner part of the bent part is chamfered on the inner diameter side. Thus, the snap fitting is implemented by use of the chamfered part of the bent part. Thus, the snap fitting can be implemented smoothly. Therefore, the assembling properties can be further improved.

Further preferably, the fitting click is provided at a circumferential position provided with the pocket. The circumferential position of the pocket is not connected in the axial direction. Thus, the retainer can be easily elastically deformed in the axial direction at the circumferential position of the fitting click. Therefore, the assembling properties can be further improved.

Further preferably, the fitting click is provided at each connection part, and the circumferential position of the fitting click provided at one connection part is different from the circumferential position of the fitting click provided at the other connection part. Thus, the circumferential positions of the elastic deformation can be differentiated between the fitting click provided at the one connection part and the fitting click provided at the other connection part. Therefore, the retainer can be easily elastically deformed in the axial direction, so that the assembling properties are further improved.

Further preferably, the snap fitting allowable configuration is provided at the connection part, and contains a slit recessed in a radial direction. Thus, the snap fitting can be implemented by use of the slit recessed in the radial direction.

Further preferably, the outer ring for the rocking bearing satisfies a relation $0.2W_2<W_1<0.8W_2$ wherein $W_1$ represents an axial length of the slit, and $W_2$ represents an axial length of the connection part, and a relation $0.2H_2<H_1<0.8H_2$ wherein $H_1$ represents an radial length of the slit, and $H_2$ represent an radial length of the connection part. Thus, the elastic deformation can be appropriately implemented at the time of snap fitting. That is, when the length dimensional relation of the slit is within the above range, the retainer can be elastically deformed by appropriate force and the snap fitting can be implemented without damaging the retainer.

Further preferably, a projection part is provided at a predetermined position of an axial end face of the connection part, and a click part is provided at the outer ring for the rocking bearing to limit the movement amount of the retainer by abutting on the projection part after the retainer is moved a predetermined amount in a circumferential direction with respect to the outer ring for the rocking bearing.

According to the above constitution, even when the retainer is moved in the circumferential direction, the projection part provided at the predetermined position of the connection part abuts on the click part provided at the outer ring for the rocking bearing. Then, the retainer cannot be moved in the circumferential direction any more. Thus, the circumferential movement of the retainer can be restricted. In addition, according to the rocking bearing having the above constitution, when the projection part is provided at the optional position, the circumferential movement amount of the retainer can be optionally determined. Thus, the retainer can be moved beyond the circumferential end of the outer ring for the rocking bearing. In addition, it is not necessary to provide a new member. Therefore, the range of movement of the retainer can be increased in the inexpensive constitution. In addition, according to the rocking bearing, since the retainer is prevented from dropping off, the assembling properties can be improved.

Further preferably, the predetermined position of the projection part is on the circumferential inner side of the pocket arranged circumferential outermost side, and the movement of the retainer is limited after a part of the retainer projects from the circumferential one end side of the outer ring for the rocking bearing. Thus, even when the predetermined position of the projection part is on the circumferential inner side as compared to a pocket arranged on the circumferential outermost side, the circumferential movement of the retainer is limited and restricted under the condition that the circumferential end of the retainer projects from the one end of the outer ring for the rocking bearing. Therefore, the movement range of the retainer can be further increased.

Further preferably, a circumferential length of the retainer projecting from the outer ring for the rocking bearing is not more than a circumferential length from the one end side of the retainer to the pocket arranged on the circumferential outermost side of the one end side thereof. Thus, the roller housed in the pocket arranged on the outermost side can be prevented from dropping off. Therefore, the assembling properties of the rocking bearing can be further improved.

Further preferably, the click part and the projection part are provided on each axial end. Thus, since the projection part engages with the click part on each axial side, the assembling properties can be further improved.

In addition, a rocking bearing includes any one of the outer rings for the rocking bearing described above, a plurality of rollers arranged on the raceway surface, a retainer for the rocking bearing having a pair of connection parts extending in a circumferential direction, and a plurality of column parts connecting the pair of connection parts to each other to form a plurality of pockets to hold the rollers between the adjacent column parts, and the radial outermost part of the column part is arranged apart from a pitch circle formed by connecting rotation centers of the rollers.

According to the retainer for the rocking bearing, the distance between the adjacent rollers is smallest on a pitch circle. Therefore, when the column part is provided apart from the pitch circle, the distance between the adjacent rollers can be small. As a result, the number of the rollers can be increased in the retainer for the rocking bearing, so that the rocking bearing is high in load capacity.

Preferably, the rocking bearing satisfies a relation $B_2 < 0.98 < B_4$ wherein $B_2$ represent an outer diameter of the column part, and $B_4$ represents a diameter of the pitch circle. Thus, when the column part is arranged on the inner side of the pitch circle, the roller in the pocket can be prevented from dropping off toward the radial inner side. In addition, the roller can be prevented from dropping off toward the radial outer side by the outer rings for the rocking bearing in general.

Further preferably, the rocking bearing satisfies:

$$0.9 < \frac{(n-1) \times l}{L} < 1.0 \qquad \text{[Formula 1]}$$

wherein n represents the number of rollers housed in the pockets, l represents a length of the pitch circle overlapping with the roller, and L represents a circumferential length of the pitch circle between the rotation centers of the rollers housed in the pockets positioned at circumferential both ends.

The formula 1 designates an occupancy of the roller on a circumference of the pitch circle. Referring to the formula 1, when the occupancy of the roller is not more than 0.9, the distance between the adjacent rollers is too long and sufficient load capacity cannot be provided. Meanwhile, when the distance between the adjacent rollers is small, the rollers could be in contact with each other at the time of rocking. This causes oil film cutting and heat generation on the roller surface. Thus, the occupancy needs to be less than 1.0.

Further preferably, the retainer for the rocking bearing is formed of a material containing polyamide 46, and 5% to 20% by weight of a fiber filler material. The resin retainer produced of a resin material by projection part molding has a high degree of freedom in configuration. In addition, when the fiber filler material such as carbon fiber and glass fiber is contained, the strength required for the retainer can be provided.

In addition, when the content of the fiber filler material is less than 5% by weight, it is hard to get the strength required for the retainer for the rocking bearing. Meanwhile, when it is more than 20% by weight, fluidity of the resin material at the time of molding deteriorates. This could cause a problem such as gas burning and lack of filling in producing the retainer having many pockets and thin column parts. Furthermore, when a filling pressure is increased to solve the problem, a burr could be generated. Therefore, the content of the fiver filler material is to be within the above range.

A retainer for a rocking bearing according to the present invention includes a pair of connection parts extending in a circumferential direction, and a plurality of column parts connecting the pair of connection parts to each other to form a plurality of pockets to hold rollers between the adjacent column parts. The radial outermost part of the column part is arranged apart from a pitch circle formed by connecting rotation centers of the rollers.

A rocking bearing includes any one of the outer rings for the rocking bearing described above, a plurality of rollers arranged on the raceway surface, and a retainer for the rocking bearing having a pair of connection parts extending in a circumferential direction and a plurality of column parts connecting the pair of connection parts to form a plurality of pockets to hold the rollers between the adjacent column parts, and satisfying a relation $\{\theta/(n-1)\}° < a_0 < 90°$ wherein n represents the number of rollers housed in the pockets, $a_0$ represent an angle formed between opposed wall surfaces of the adjacent column parts, and $\theta$ represents a center angle formed between rotation centers of the rollers housed in the pockets positioned at circumferential both ends.

When the angle $a_0$ formed between the opposed wall surfaces of the adjacent column parts is decreased in the retainer for the rocking bearing, the number of pockets formed at the same time in one die is reduced. Therefore, the larger angle $a_0$ is desirable in view of molding improvement, and a lower limit value of the angle $a_0$ is set to $\{\theta/(n-1)\}°$.

Meanwhile, when the angle $a_0$ is increased, the roller could not be appropriately held by the pocket. More specifically, when $a_0 \geq 90°$, component force $F_1$ acting in a parallel direction to the wall surface and component force $F_2$ acting in a vertical direction to the wall surface of the force pressing the wall surface of the column part by the roller have a relation: $F_1 \geq F_2$. In this case, the roller could be brought on the column part and in contact with the adjacent roller. This causes the oil film cutting and heat generation on the roller surface. Therefore, the smaller angle $a_0$ is desirable in view of appropriate roller retention, so that the upper limit value of the angle $a_0$ is set to 90°.

Thus, the rocking bearing can be high in productivity and load capacity.

A retainer for a rocking bearing according to the present invention includes a pair of connection parts extending in a circumferential direction, and a plurality of column parts connecting the pair of connection parts to each other to form a plurality of pockets to hold the rollers between the adjacent column parts, and satisfies a relation $\{\theta/(n-1)\}° < a_0 < 90°$ wherein n represents the number of rollers housed in the pockets, $a_0$ represents an angle formed between opposed wall surfaces of the adjacent column parts, and $\theta$ represents a center angle formed between rotation centers of the rollers housed in the pockets positioned at circumferential both ends.

A rocking bearing includes an outer ring for the rocking bearing containing a raceway surface on the inner diameter side and having a flange part provided by bending each axial end to the inner diameter side, a plurality of rollers arranged on the raceway surface and any one of the retainers for the rocking bearing described above.

According to a still another aspect of the present invention, an air disk brake system includes any one of the rocking bearing described above.

Since the above air disk brake system contains the rocking bearing having preferable assembling properties, its productivity can be improved.

BEST MODE FOR CARRYING OUT THE INVENTION

Figure 1:
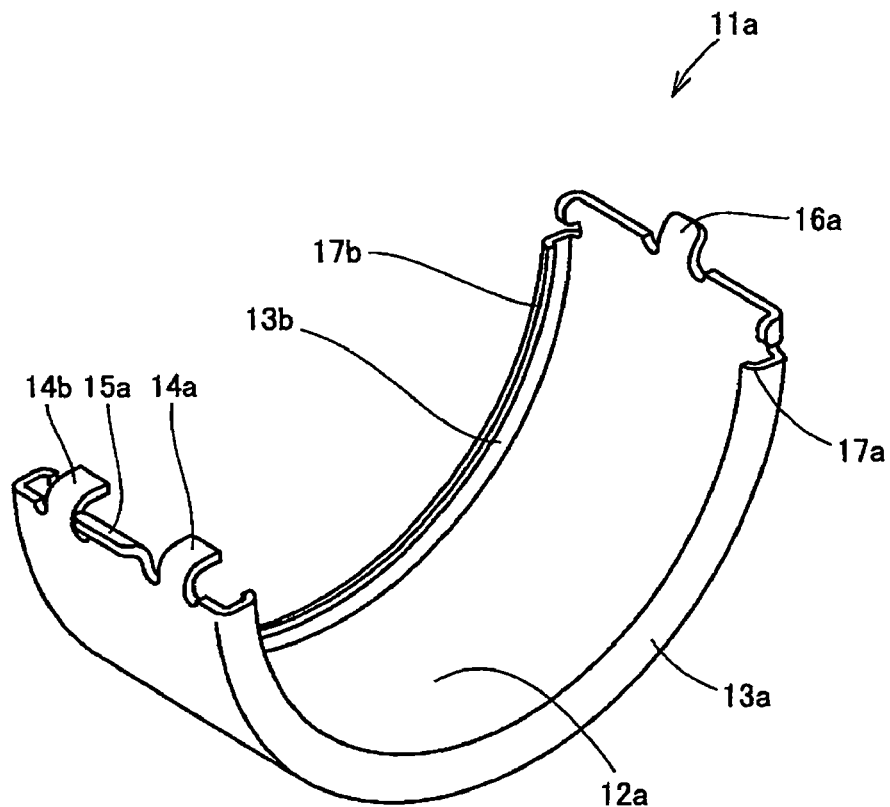
FIG. 1 is a perspective view showing an outer ring for a rocking bearing according to one embodiment of the present invention.

Embodiments of the present invention will be described with reference to the drawings hereinafter. FIG. 1 is a perspective view showing an outer ring a the rocking bearing (referred to as the "outer ring" hereinafter) according to one embodiment of the present invention. A constitution of an outer ring 11a will be described with reference to FIG. 1. The outer ring 11a has a configuration provided by splitting a cylindrical member at two circumferential certain points. A raceway surface 12 on which rollers roll is provided on the inner diameter side of the outer ring 11a.

Projection parts 14a and 14b extending toward the inner diameter side are provided at circumferential one end of the outer ring 11a. Although a retainer arranged on the inner diameter side of the outer ring 11a can be moved in a circumferential direction, its circumferential movement is restricted at the one end by the projection parts 14a and 14b.

In addition, a tongue-shaped protrusion part 15a bent toward the outer diameter side is provided between the projection parts 14a and 14b. Meanwhile, a tongue-shaped protrusion part 16a is also provided at the circumferential other end of the outer ring 11a. By use of the protrusion parts 15a and 16a, the outer ring 11a is mounted on a housing (not shown) and fixed so that the circumferential movement of the outer ring 11a is restricted.

The outer ring 11a has flange parts 13a and 13b whose both axial ends are bent toward the inner diameter side. The flange parts 13a and 13b restrict the axial movement of rollers and the retainer arranged on the inner diameter side of the outer ring 11a.

Here, the flange parts 13a and 13b have bent parts 17a and 17b bent toward the side of the raceway surface 12a in the axial direction so as to hold the retainer arranged on the inner diameter side, respectively. The bent parts 17a and 17b are sequentially provided so as to be continued in the circumferential direction.

Figure 2:
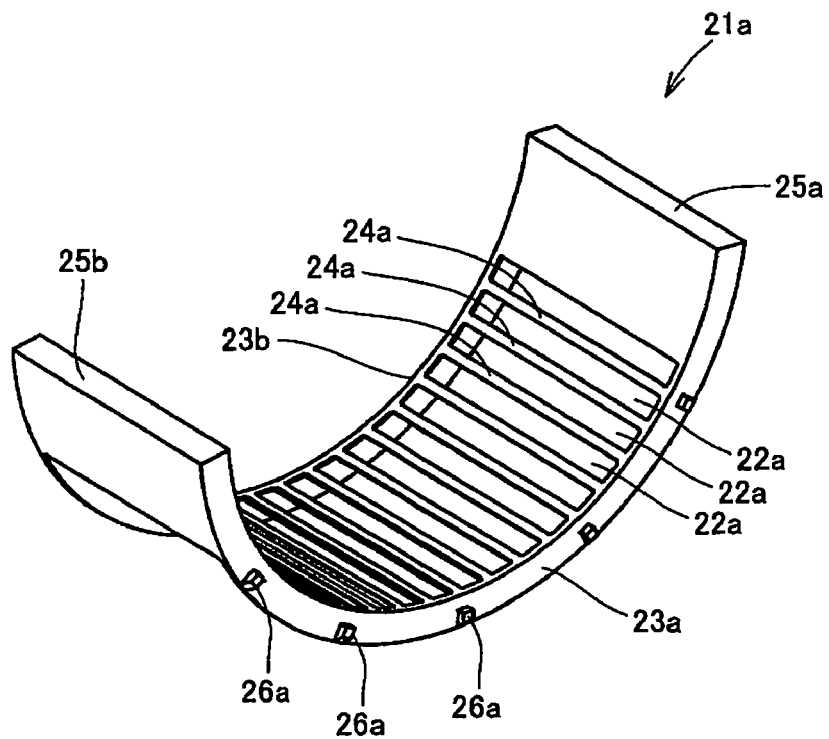
FIG. 2 is a perspective view showing a retainer contained in a rocking bearing according to one embodiment of the present invention.
Figure 3:
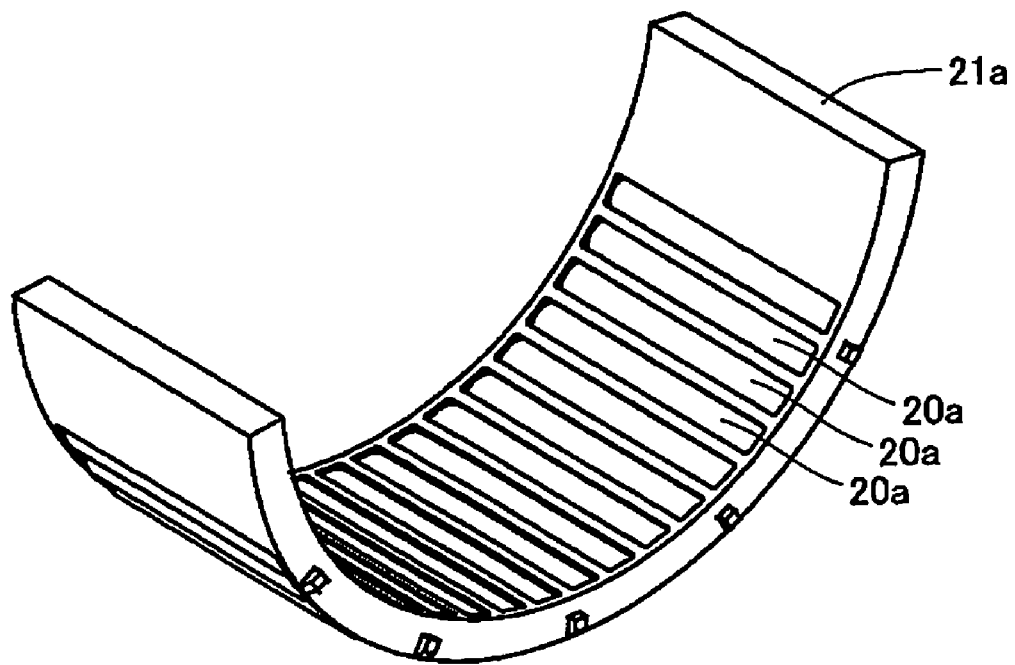
FIG. 3 is a perspective view showing the retainer having rollers in pockets on the lower side.
Figure 4:
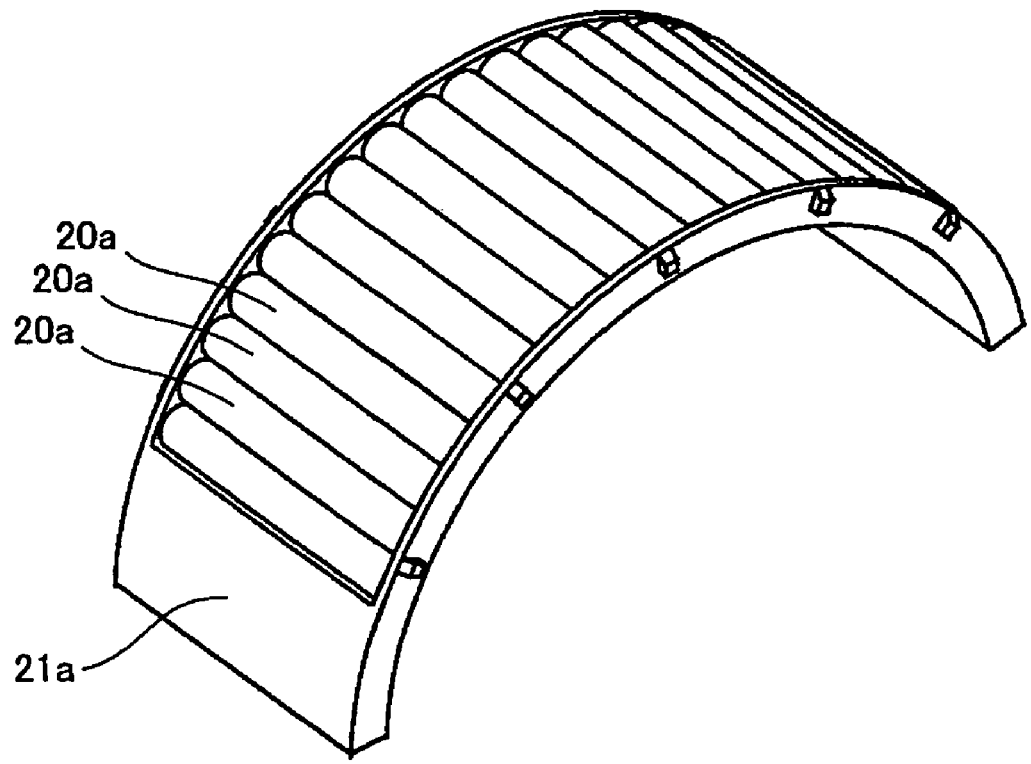
FIG. 4 is a perspective view showing the retainer having the rollers in the pockets on the upper side.

Next, a description will be made of a constitution of the retainer provided in the rocking bearing according to one embodiment of the present invention and arranged on the inner diameter side of the outer ring 11a. FIG. 2 is a perspective view showing the retainer to be arranged on the inner diameter side of the outer ring 11a. FIGS. 3 and 4 are perspective views showing states in which rollers 20a are housed in pockets 22a of a retainer 21a shown in FIG. 2. FIG. 3 shows a state in which the rollers 20a are provided on the lower side, and FIG. 4 shows a state in which the rollers 20a are provided on the upper side. Referring to FIGS. 1 to 4, the retainer 21a has a configuration provided by splitting a cylindrical member at two circumferential certain points similar to the above-described outer ring 11a and follows the configuration of the outer ring 11a.

The retainer 21a includes pockets 22a to hold the rollers 20a, and a pair of connection parts 23a and 23b positioned on both axial sides of the pockets 22a and continued in the circumferential direction, that is, extending in the circumferential direction. Each pocket 22a holds the one roller 20a. A distance between the pocket 22a positioned on the outermost side in the circumferential direction and each of circumferential ends 25a and 25b of the retainer 21a is set so as to be larger than a distance between the pockets 22a. In addition, a rotation member (not shown) contained in an air disk brake system is arranged on the inner diameter side of the retainer 21a.

The pair of connection parts 23a and 23b is connected in the axial direction by column parts 24a positioned between the pockets 22a and extending in the axial direction. The column part 24a is provided on the inner diameter side rather than a PCD (Pitch Circle Diameter) of the roller 20a held in the pocket 22a. Thus, the number of the rollers 20a that can be held by the retainer 21a can be increased. In this case, load capacity of the rocking bearing containing such retainer 21a can be increased. In addition, after the rocking bearing has been assembled, the raceway surface 12a and the column part 24a hold the roller 20a so as to sandwich it, to restrict the radial movement of the roller 20a.

The pair of connection parts 23a and 23b have engagement parts 26a to engage with the bent parts 17a and 17b. The engagement parts 26a project from the connection parts 23a and 23b in the axial direction. The engagement part 26a is not continued along the connection parts 23a and 23b in the circumferential direction, but the plurality of engagement parts 26a are provided at certain circumferential points of the connection parts 23a and 23b.

Figure 5:
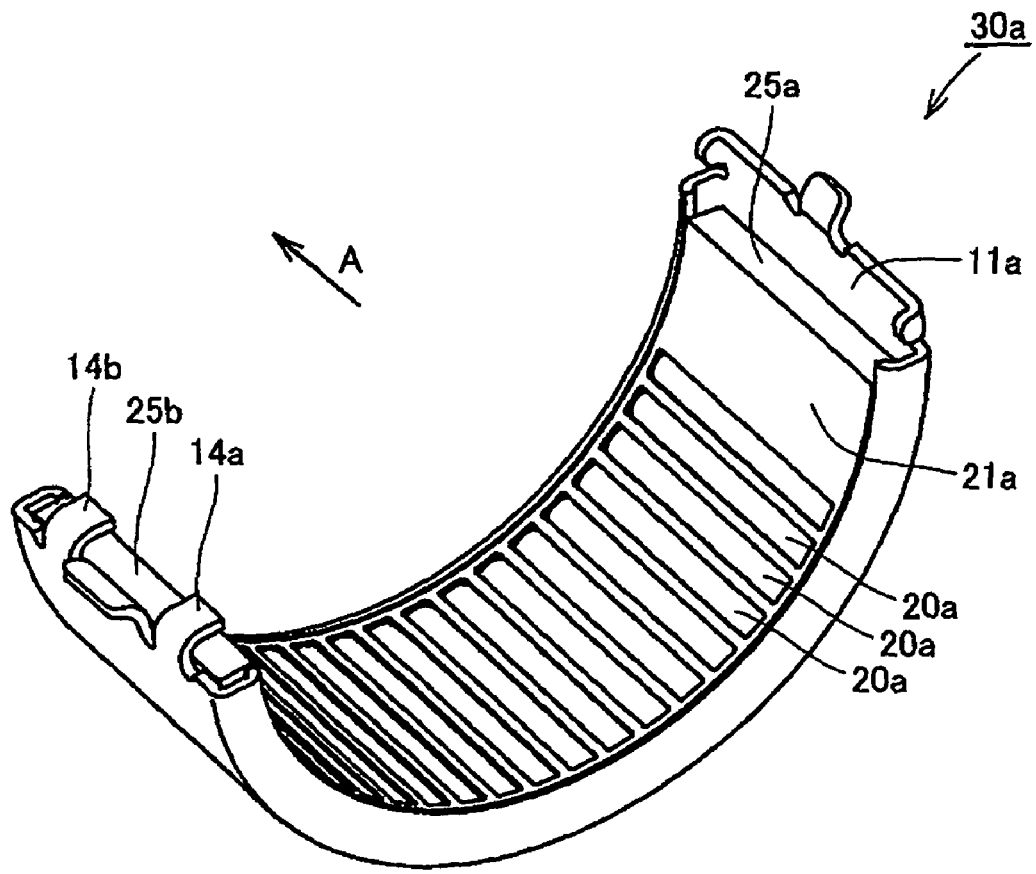
FIG. 5 is a perspective view showing a rocking bearing according to one embodiment of the present invention.
Figure 6:
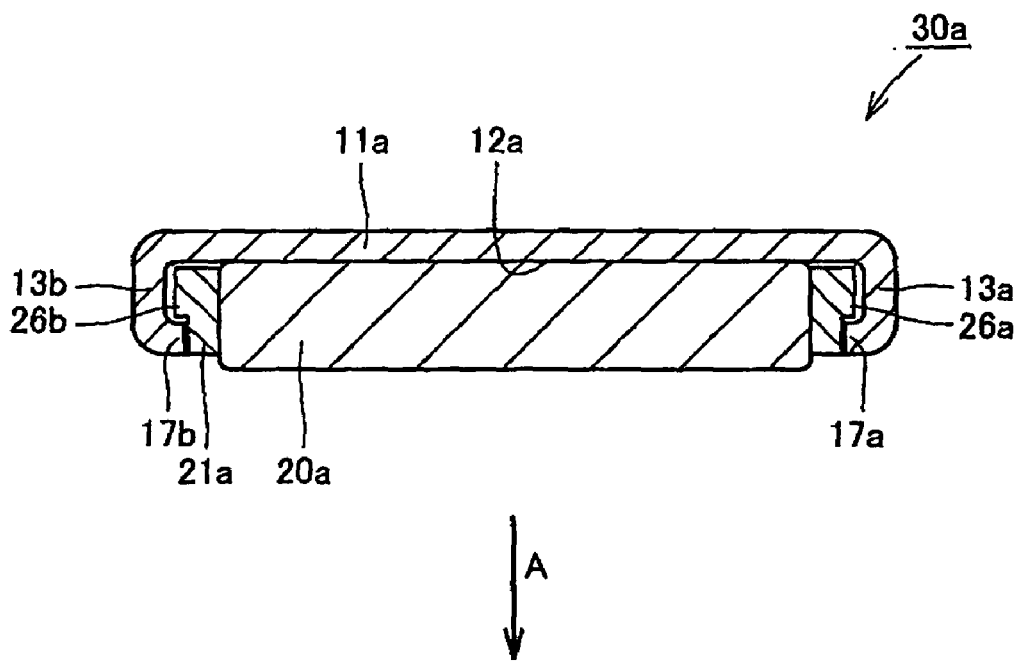
FIG. 6 is a sectional view showing the rocking bearing shown in FIG. 5 when cut by a plane containing an engagement part.

FIG. 5 is a perspective view showing a rocking bearing 30a according to one embodiment of the present invention. FIG. 6 is a sectional view showing the rocking bearing 30a shown in FIG. 5 cut by a plane containing the engagement part. A description will be made of a constitution of the rocking bearing 30a according to one embodiment of the present invention with reference to FIGS. 1 to 6. The rocking bearing 30a includes the outer ring 11a, the plurality of rollers 20a, and the retainer 21a to retain the rollers 20a. The rocking bearing 30a is assembled such that the retainer 21a holding the rollers 20a is arranged on the inner diameter side of the outer ring 11a.

Here, at the time of assembling, the retainer 21a is arranged on the inner diameter side of the outer ring 11 such that the bent parts 17a and 17b may engage with the engagement parts 26a. In this constitution, the retainer 21a can be held and enfolded by the bent parts 17a and 17b and the engagement parts 26a in the outer ring 11a. Thus, even when the retainer 21a comes to be moved toward the inner diameter side of the outer ring 11a, that is, toward a direction shown by arrows A in FIGS. 5 and 6, the engagement parts 26a of the retainer 21a are caught by the bent parts 17a and 17b, so that the movement of the retainer 21a toward the inner diameter side can be restricted. Therefore, the rollers 20a and the retainer 21a can be prevented from dropping out of the outer ring 11a. In this case, since the retainer 21a is held in such a manner that the bent parts 17a and 17b engage with the engagement parts 26a, the rollers 20a and the retainer 21a can be surely prevented from dropping out of the outer ring 11a. In addition, the rollers 20a and the retainer 21a are not separated and not shifted from each other. According to the rocking bearing 30a, when it is mounted on the air disk brake system that will be described below, a mounting defect is hardly generated. In addition, at the time of assembling, the rollers 20a and the retainer 21 are assembled as shown in FIG. 4, and then the outer ring 11a is assembled from the upper side in FIG. 4 to be fit in. Thus, the assembling operation can be performed easily without dispersing the rollers 20a.

Furthermore, since the bent parts 17a and 17b are continued in the circumferential direction, the bent parts 17a and 17b can engage with the engagement parts 26a regardless of the circumferential positions of the engagement parts 26a. Therefore, the retainer 21a and the rollers 20a are more surely prevented from dropping off. Here, the engagement part 26a may be continued in the circumferential direction. In this case, the retainer 21a can be held by the bent parts 17a and 17b provided so as to be continued in the circumferential direction over a circumferential wide range. Therefore, the retainer 21a can be held more stably, and the rollers 20a and the retainer 21a can be further prevented from dropping off.

In addition, the bent parts 17a and 17b may be provided at circumferential certain points instead of being continued in the circumferential direction. In this case also, the retainer 21a is held by the bent parts 17a and 17b, and the rollers 20a and the retainer 21a can be prevented from dropping off.

In addition, since the bent parts 17a and 17b are provided at both flange parts 13a and 13b, the retainer 21a can be held so as to be enfolded by both flange parts 13a and 13b. Therefore, the rollers 20a and the retainer 21a can be prevented from dropping off more surely.

Here, recently, the rocking bearing employed in the air disk brake system comes to be strongly required to be miniaturized and have high load capacity as the air disk brake system is reduced in size and increased in power. Thus, as a method for increasing the load capacity of the rocking bearing, a method for increasing a roller diameter or increasing the number of rollers is generally used. However, the increase in roller diameter is contrary to the demand for miniaturization of the rocking bearing.

Meanwhile, when the retainer is produced with a resin material by injection molding, a pocket is formed by punching out a mold toward the radial outer side of the retainer. At this time, various efforts have been made to improve molding properties such that the plurality of adjacent pockets are formed at the same time with one mold. However, when the number of pockets to hold the rollers is increased, the molding properties are lowered because the number of molds is increased and the mold becomes large and its structure becomes complicated. In addition, when the number of pockets formed at the same time is increased forcedly to punch out the mold, the retainer could be damaged.

Figure 7:
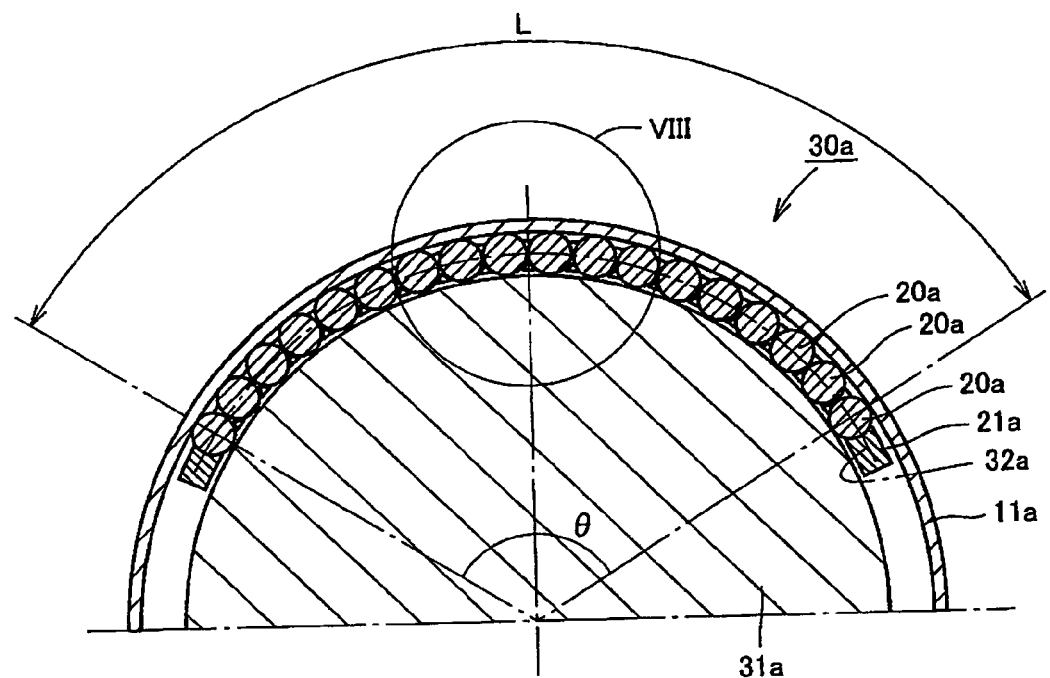
FIG. 7 is a sectional view showing the rocking bearing shown in FIG. 5 viewed in an axial direction.
Figure 8:
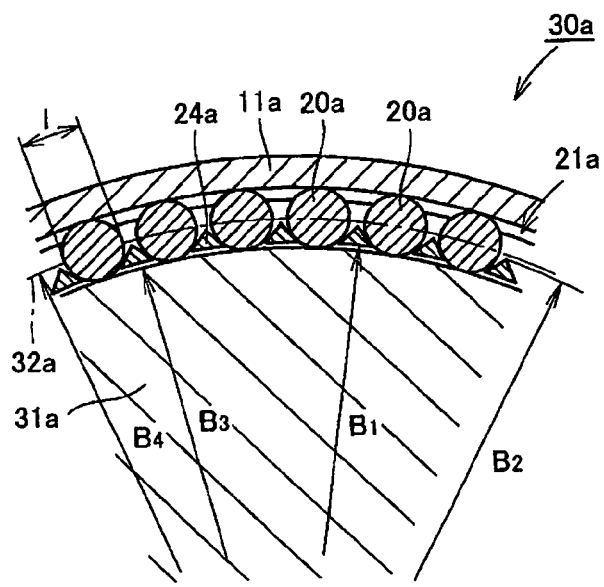
FIG. 8 is an enlarged view showing a part VIII in FIG. 7.
Figure 9:
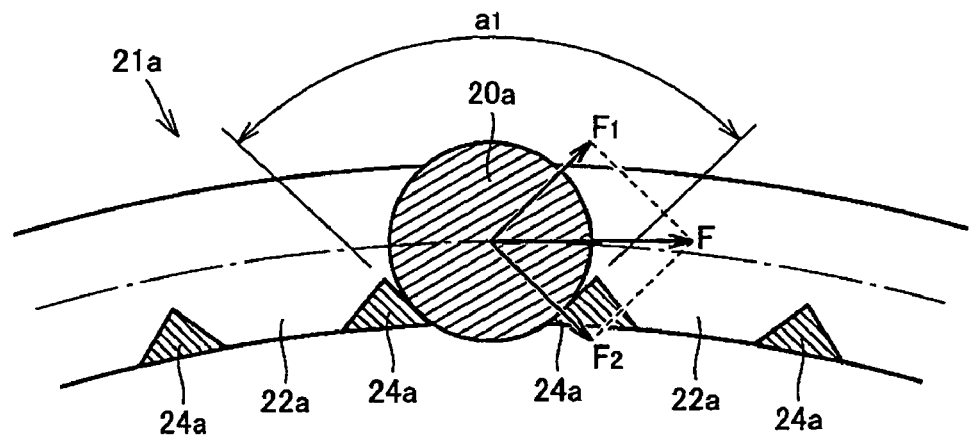
FIG. 9 is a further enlarged view of FIG. 8.

Therefore, the column part 24a and the like preferably has the following relations when the column part 24a is provided. FIG. 7 is a sectional view when the rocking bearing 30a is cut by a plane perpendicular to the axial direction. FIG. 8 is an enlarged view showing a part VIII in FIG. 7. FIG. 9 is an enlarged view of FIG. 8.

Referring to FIGS. 7 and 8, a rotation member 31a is arranged on the inner diameter side of the rocking bearing 30a. Here, it is preferable to have relations $B_3 \leq B_1$ and $B_2 < 0.98 \times B_4$ wherein $B_1$ represents an inner diameter of the column part 24a, $B_2$ represents an outer diameter thereof, $B_3$ represents a diameter of the rotation member 31a, and $B_4$ represents a pitch circle 32a. In this constitution, the number of rollers 20a contained in the retainer 21a can be increased. Therefore, the load capacity of the rocking bearing 30a can be high.

In addition, referring to FIGS. 7 to 9, a wall surface of the column part 24a for guiding the rotation of the roller 20a (referred to as the "guide surface" hereinafter) is a flat surface (its cross sectional configuration is a straight line). Thus, dimensions are set to satisfy $\{\theta/(n-1)\}° < a_1 < 90°$ wherein n represents the number of the rollers 20a housed in the pockets 22a, $a_1$ represents an angle formed between opposed wall surfaces of the adjacent column parts 24a, and θ represents a center angle between rotation centers of the rollers 20a housed in the pockets 22a positioned circumferentially at both ends.

As the angle $a_1$ formed between the opposed wall surfaces (designating the "guide surface") of the adjacent column parts 24a is decreased, the number of pockets 22a that can be formed at the same time by the one mold is decreased. Therefore, it is preferable that the angle $a_1$ is large in view of the improvement of the molding properties, so that a lower limit value of the angle $a_1$ is set to $\{\theta/(n-1)\}°$.

Meanwhile, when the angle $a_1$ is increased, the roller 20a could not be held appropriately in the pocket 22a. More specifically, force F applied from the roller 20a to the wall surface of the column part 24a can be decomposed into force $F_1$ acting in a parallel direction to the wall surface of the column part 24a and force $F_2$ acting in a vertical direction to the wall surface of the column part 24a. Thus, the forces $F_1$ and $F_2$ have a relation $F_1 \geq F_2$ when $a_1 \geq 90°$. In this case, the roller 20a could be brought on the column part 24a and in contact with the adjacent roller 20a at the time of rocking. This causes oil film cutting and heat generation on the surface of the roller 20a. Therefore, in order to hold the roller 20a appropriately, the angle $a_1$ is preferably small and its upper limit value of the angle $a_1$ is set to 90°.

In addition, although the retainer contained in the rocking bearing has the column part on the inner diameter side of the pitch circle in the above embodiment, the column part may be provided on the upper side of the pitch circle or on the outer diameter side of the pitch circle. In addition, the present invention may be applied to a retainer having no connection part.

Figure 10:
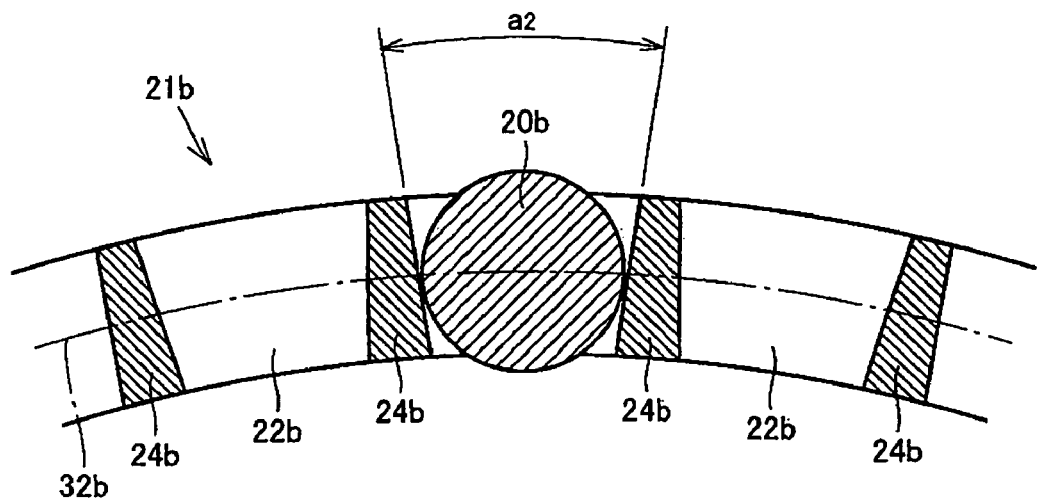
FIG. 10 is a view showing a retainer for the rocking bearing according to another embodiment of the present invention.

For example, a description will be made of a retainer 21b for the rocking bearing (referred to as the "retainer 21b" hereinafter) according to another embodiment of the present invention with reference to FIG. 10. In addition, since a basic constitution of the retainer 21b is the same as that of the retainer 21a, a description of the common part is omitted and a different part will be mainly described.

The retainer 21b has pockets 22b, a pair of connection parts 23a and 23b extending in the circumferential direction, and column parts 24b connecting the pair of connection parts to each other. In addition, the column part 24b extends in the radial direction across a pitch circle 32b. Thus, dimensions are set to satisfy $\{\theta/(n-1°)\} < a_2 < 90°$ wherein n represents the number of rollers, θ represents the center angle, and $a_2$ represents an angle formed between opposed wall surfaces of the adjacent column part 24b. Thus, when the angle formed between the opposed wall surfaces of the adjacent column parts is set within the above range, the effect of the present invention can be achieved regardless of the arranged position of the column part.

In addition, the retainer 21a and the like is preferably formed of a resin in view of mass productivity. For example, the retainer 21a is formed of a resin material in which fiber filler material is contained in polyamide 46 by injection molding. A specific example of the fiber filler material includes carbon fiber and glass fiber.

In addition, a content of the fiber filler material in polyamide 46 is within a range of 5% to 20% by weight. When the content of the fiber filler material is less than 5% by weight, it is difficult to provide the strength required for the retainer 21a. Meanwhile, when it is more than 20% by weight, the fluidity of the resin material at the time of molding deteriorates. This causes the problem such as gas burn and filling shortage in molding the retainer 21a having many pockets 22a and a thin column part. Furthermore, when a filling pressure is increased in order to solve the above problem, a burr could be generated. Therefore, it is preferable that the content of the fiber filler material is within the above-described range.

In addition, referring to FIG. 8, dimensions are set to satisfy the following formula 2 wherein n represents the number of rollers 20a housed in the pockets 22a, l represents a length of a part of the pitch circle 32a overlapping with the roller 20a, and L represents a circumferential length of the pitch circle 32a between the rotation centers of the rollers 20a housed in the pockets 22a positioned at circumferential both ends.

$$0.9 < \frac{(n-1) \times l}{L} < 1.0 \quad \text{[Formula 2]}$$

The formula 2 shows an occupancy of the rollers 20a on the circumference of the pitch circle 32a. Referring to the formula 2, when the occupancy of the rollers 20a is 0.9 or less, the distance between the adjacent rollers 20a becomes too large, so that sufficient load capacity cannot be obtained. Meanwhile, when the distance between the adjacent rollers 20a is small, the rollers 20a could be in contact with each other at the time of rocking. This causes oil film cutting and heat generation on the surface of the roller 20a. Thus, the occupancy of the rollers 20a needs to be less than 1.0.

Figure 11:
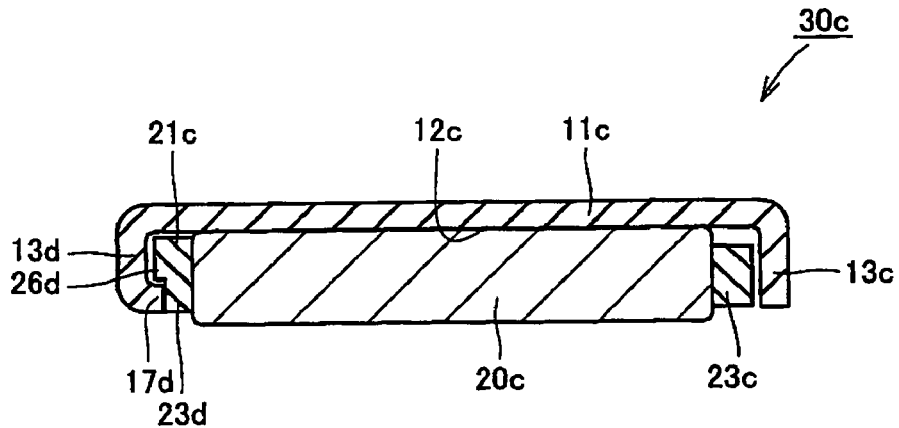
FIG. 11 is a sectional view showing a rocking bearing including an outer ring for the rocking bearing according to another embodiment of the present invention when cut by a plane containing an engagement part.

In addition, although the bent parts are provided at both flange parts and the engagement parts are provided at both connection parts in the above embodiment, the bent part and the engagement part engaging with it may be only provided at one flange part and one connection part, respectively. FIG. 11 is a sectional view showing a part of a rocking bearing 30c in this case, and corresponds to FIG. 6. Referring to FIG. 11, a bent part 17d bent toward a raceway surface 12c in the axial direction is provided only on the side of one flange part 13d, in an outer ring 11c contained in the rocking bearing 30c. The other flange part 13c just projects toward the inner diameter side. An engagement part 26d projecting in the axial direction is provided at one connection part 23d of a retainer 21c. The other connection part 23c does not have the engagement part. In this constitution also, the bent part 17d of the outer ring 11c engages with the engagement part 26d of the retainer 21c, and the retainer 21c can be held so as to be enfolded. Therefore, rollers 20c and the retainer 21c can be prevented from dropping out of the outer ring 11c.

Figure 12:
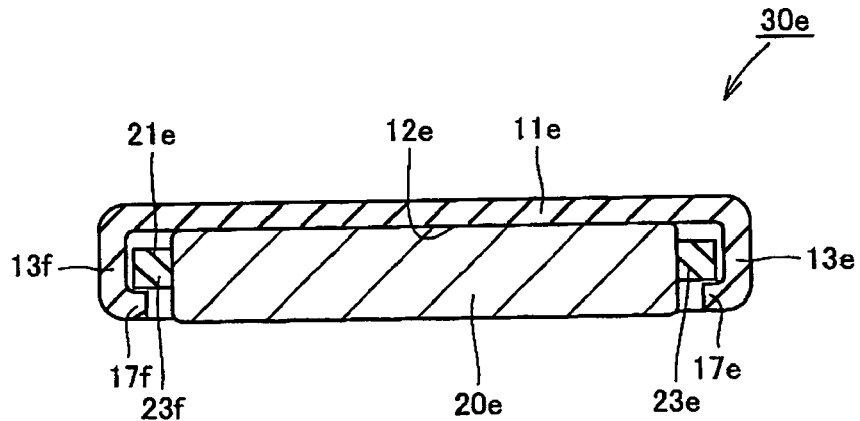
FIG. 12 is a sectional view showing a rocking bearing including an outer ring for the rocking bearing according to still another embodiment of the present invention when cut by a plane containing an engagement part.

In addition, although the retainer includes the engagement part in the above embodiment, it may not include the engagement part. FIG. 12 is a sectional view showing a part of a rocking bearing 30e in this case and corresponds to FIG. 6. Referring to FIG. 12, bent parts 17e and 17f bent toward a raceway surface 12e in the axial direction are provided at both flange parts 13e and 13f in an outer ring 11e contained in the rocking bearing 30e. In addition, the engagement part projecting in the axial direction is not provided at both connection parts 23e and 23f of a retainer 21e. In this constitution also, the retainer 21e can be held such that the connection parts 23e and 23f of the retainer 21e are enfolded by the bent parts 17e and 17f of the outer ring 11e. Thus, rollers 20e and the retainer 21e can be prevented from dropping out of the outer ring 11e. In this case also, the bent part may be provided only at one of the flange parts.

Here, although the retainer 21a is held by the bent parts 17a and 17b of the outer ring 11a, a snap fitting allowable configuration may be provided at the retainer 21a and/or the bent parts 17a and 17b so that the retainer 21a can be held by the bent parts 17a and 17b after passing through the bent parts 17a and 17b. In this case, the snap fitting allowable configuration includes the engagement parts 26a and 26b as fitting clicks projecting from the end faces of the connection parts 23a and 23b of the retainer 21a in the axial direction. The engagement parts 26a and 26b as the fitting clicks can snap-fit in the bent parts 17a and 17b. In addition, chamfered parts may be provided at corners of the engagement parts 26a and 26b on the outer diameter side. In addition, chamfered parts may be provided at corners of the bent parts 17a and 17b on the inner diameter side.

Figure 13:
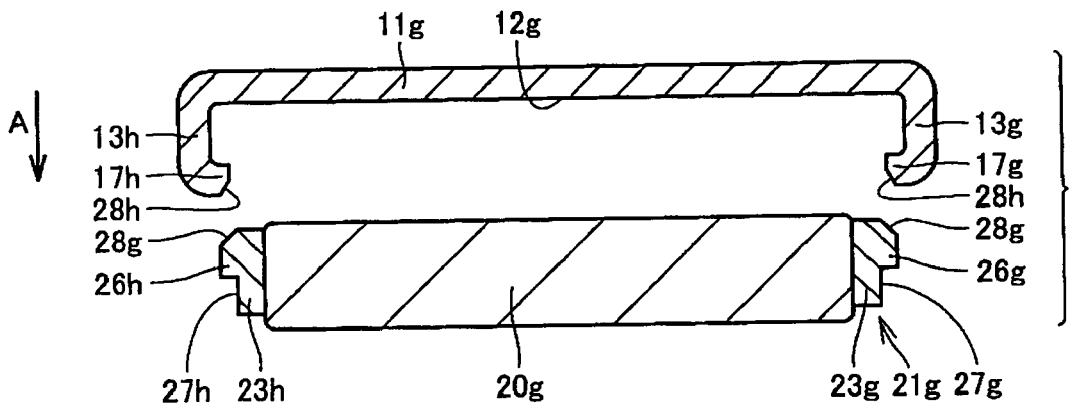
FIG. 13 is a sectional view showing a state before a roller and a retainer are assembled in an outer ring for the rocking bearing.
Figure 14:
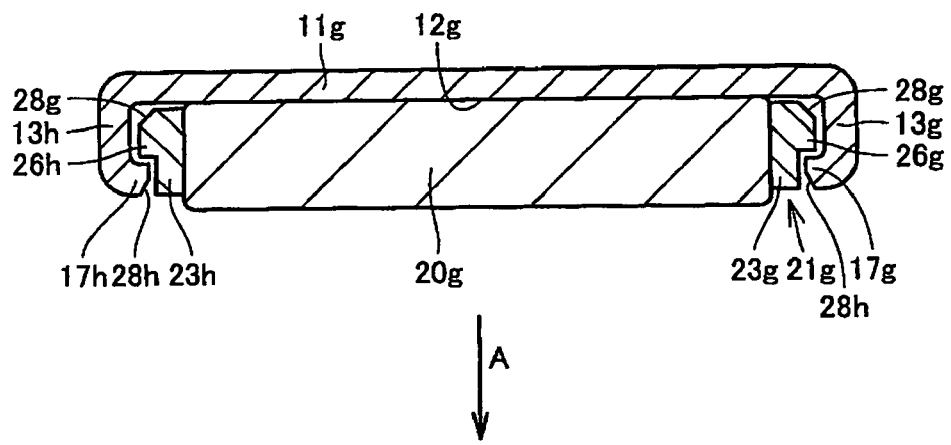
FIG. 14 is a sectional view showing a state after the roller and the retainer have been assembled in the outer ring for the rocking bearing.

Here, a description will be made of an assembling method of a rocking bearing 30g. FIG. 13 is a sectional view showing an outer ring 11g, a roller 20g, and a retainer 21g before assembled. In addition, FIG. 14 is a sectional view showing the outer ring 11g, the roller 20g and the retainer 21g after assembled. In addition, since basic constitutions of the rocking bearing 30g, the outer ring 11g, the retainer 21g and the like are the same as those of the rocking bearing 30a and the like, their description will be omitted. Referring to FIGS. 13 and 14, chamfered parts 28g are provided at outer-diameter corners of engagement parts 26g and 26h as the fitting clicks projecting from end faces 27g and 27h of connection parts 23g and 23h of the retainer 21g. In addition, chamfered parts 28h are also provided at corners of the bent parts 17g and 17h on the inner diameter side.

First, the plurality of rollers 20g are put in pockets 22g of the retainer 21g as shown in FIG. 4. Then, the outer ring 11g is moved in a direction shown by an arrow A shown in FIG. 13. Thus, the bent parts 17g and 17h and the engagement parts 26g and 26h serving as the fitting clicks are elastically deformed in the axial direction and the retainer 21g passes through the bent parts 17g and 17h. Then, the bent parts 17g and 17h snap-fit in the engagement parts 26g and 26h as the fitting clicks, and the retainer 21g is held by the bent parts 17g and 17h. Thus, the rocking bearing 30g is assembled. In this case, the retainer 21g in which the rollers 20g are incorporated may be moved from a direction opposite to the arrow A.

Since the retainer 21g is held in the outer ring 11g so as to be enfolded by the bent parts 17g and 17h, the retainer 21g is prevented from moving in the direction of the arrow A in FIGS. 13 and 14, so that the retainer 21g does not drop out of the outer ring 11g. Since this snap fitting uses the elastic deformation of the bent parts 17g and 17h of the outer ring 11g and the engagement parts 26g and 26h serving as the fitting clicks of the retainer 21g, strong force is not necessarily applied at the time of assembling, so that the assembling can be easily performed. In addition, the outer ring 11g and the retainer 21g can be prevented from being damaged at the time of assembling. Therefore, the assembling properties of the rocking bearing 30g can be improved.

Figure 15:
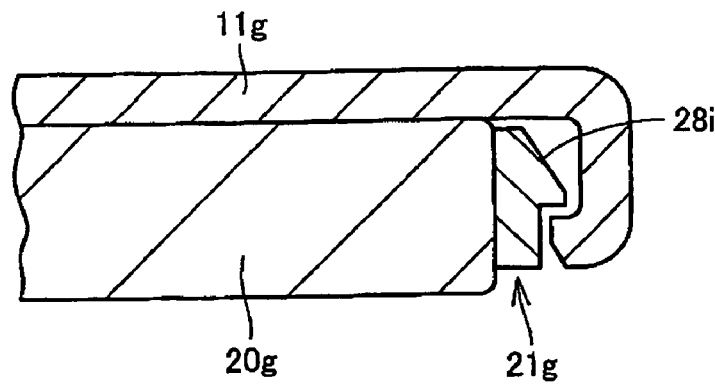
FIG. 15 is an enlarged view showing a part of a rocking bearing according to still another embodiment of the present invention.

Since the chamfered parts 28g and 28h are provided at the corners on the outer diameter side of the engagement parts 26g and 26h as the fitting clicks and at the corners on the inner diameter side of the bent parts 17g and 17h, respectively, the snap fitting can be implemented by use of the chamfered parts 28g provided at the engagement parts 26g and 26h as the fitting clicks and the chamfered part 28h provided at the bent parts 17g and 17h. Thus, the snap fitting can be smoothly performed. Therefore, the assembling properties are further improved. In this case, the chamfered parts may be provided at the engagement parts 26g and 26h as the fitting clicks or the bent parts 17g and 17h. In addition, the chamfered part provided on the outer diameter side of the engagement parts 26g and 26h as the fitting clicks include not only a chamfered part provided by scraping off the corner like the normal chamfered parts but also a chamfered part 28i having a large sloped surface as shown in FIG. 15.

Here, it is preferable that the engagement parts 26g and 26h as the fitting clicks are provided at the circumferential positions in which the pocket 22g is formed. In the connection parts 23g and 23h, the circumferential positions in which the pocket is provided are not connected in the axial direction. In other words, the column part is not provided there. Thus, the retainer 21g can be easily elastically deformed in the axial direction in the circumferential positions of the engagement parts 26g and 26h as the fitting clicks. Therefore, the assembling properties can be further improved.

In addition, although the engagement parts as the fitting clicks are provided at the circumferential same position, in both connection parts in the above embodiment, as another example, the circumferential position of the engagement part as the fitting click provided in one connection part may be different from the circumferential position of the engagement part as the fitting click provided in the other connection part.

Figure 16:
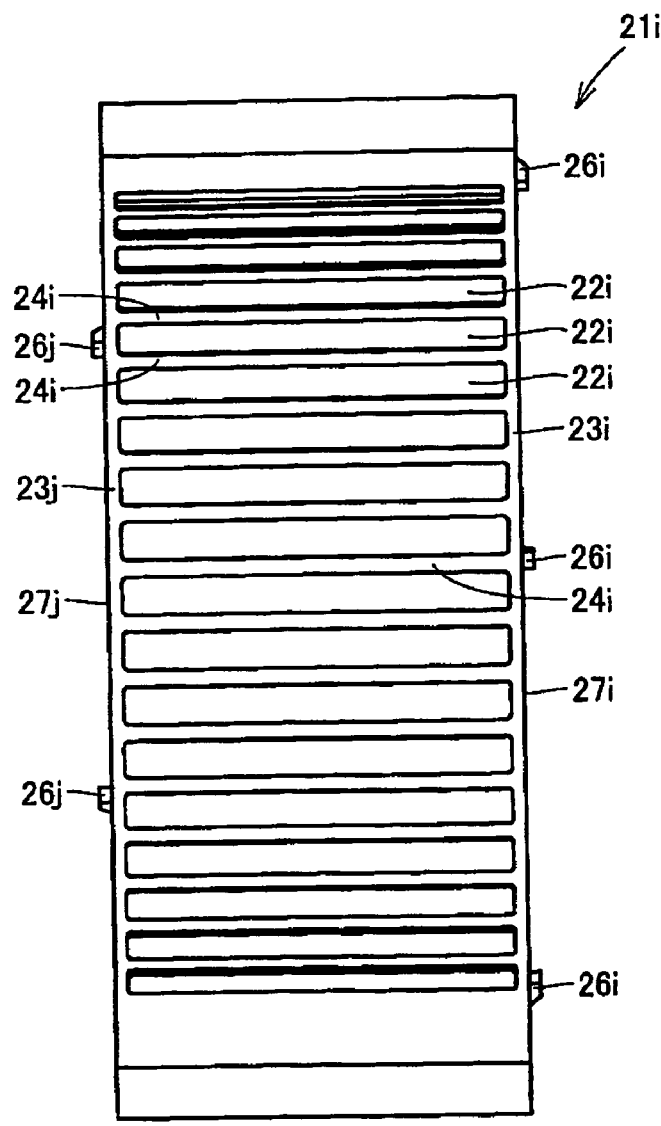
FIG. 16 is a view showing a retainer provided in a rocking bearing according to still another embodiment of the present invention.

FIG. 16 is a view showing a retainer taken from the inner diameter side in the above case. Referring to FIG. 16, a retainer 21i has the same constitution as that of the above retainer basically, and includes pockets 22i, a pair of connection parts 23i and 23j, and column parts 24i. Here, the pair of connection parts 23i and 23j have engagement parts 26i and 26jas fitting clicks projecting from end faces 27i and 27j in the axial direction, respectively. Here, the circumferential position of the engagement part 26i as the fitting click provided in one connection part 23i is different from the circumferential position of the engagement part 26jas the fitting click provided in the other connection part 23j.

Thus, when the snap fitting is performed, the engagement part 26i as the fitting click provided in the one connection part 23i and the engagement part 26jas the fitting click provided in the other connection part 23j are not elastically deformed at the same circumferential position. Therefore, the retainer 21i can be elastically deformed in the axial direction at the circumferential different positions of the engagement parts 26i and 26jas the fitting clicks, so that the assembling properties are further improved.

Especially, when the axial projection amount of the engagement parts 26i and 26jas the fitting clicks is increased to surely prevent separation of the outer ring and the retainer 21i, in the case where the engagement parts 26i and 26jas the fitting clicks are provided at the same axial positions, the elastic deformation amount of each of the engagement parts 25i and 26jas fitting clicks is increased at the time of assembling, which could cause the damage of the engagement parts 26i and 26jas the fitting clicks. However, according to the above constitution, the engagement parts 26i and 26jas the fitting clicks can be prevented from being damaged.

In addition, although the snap fitting allowable configuration includes the engagement part as the fitting click projecting from the end face of the connection part of the retainer in the above embodiment, as another example, the snap fitting allowable configuration may be provided at the connection part of the retainer and have a slit recessed in the radial direction.

Figure 17:
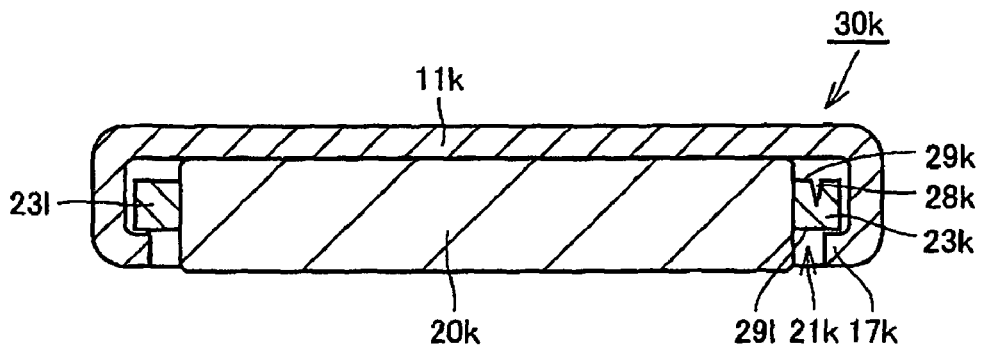
FIG. 17 is a sectional view showing a rocking bearing according to still another embodiment of the present invention.

FIG. 17 is a sectional view showing a rocking bearing in this case and corresponds to FIG. 6. Referring to FIG. 17, a rocking bearing 30k has the same configuration as that of the above rocking bearing basically, and includes an outer ring 11k, a roller 20k, and a retainer 21k to hold the roller 20k.

Here, a slit 28k allowing the axial elastic deformation of a connection part 23k is provided at the one connection part 23k of a pair of connection parts 23k and 23l of the retainer 21k. The slit 28k is recessed from an outer diameter surface 29k of the connection part 23k in the radial direction, that is, toward the inner diameter side so as to be continued along the connection part 23k. In addition, the slit 23k has a roughly V-shaped section. Here, the snap fitting allowable configuration includes the slit 28k. The retainer 21k can be elastically deformed so that the connection part 23k is shrunk in the axial direction by use of the slit 28k. Therefore, the connection part 23k snap-fit in the bent part 17k, whereby the retainer 21k can be held by the bent part 17k of the outer ring 11k. Therefore, similar to the above rocking bearing, its assembling properties can be improved.

Figure 18:
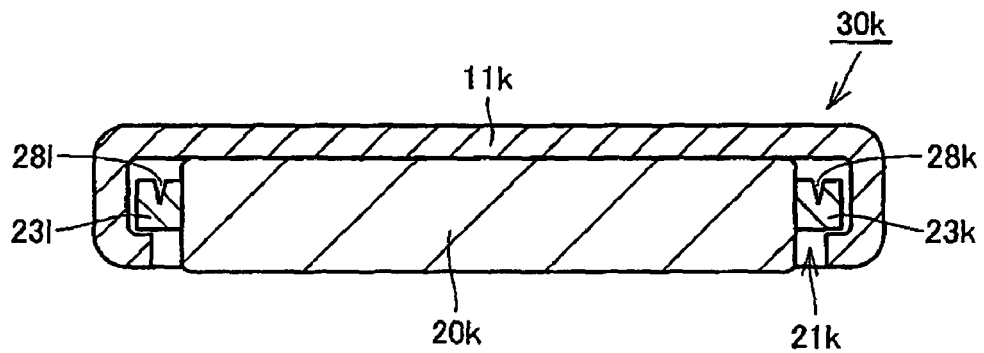
FIG. 18 is a sectional view showing a rocking bearing according to still another embodiment of the present invention.

In addition, although the slit 28k is provided only one connection part 23k in the above embodiment, as another case, slits 28k and 28l may be provided at both connection parts 23k and 23l, respectively as shown in FIG. 18. In other words, the snap fitting allowable configuration may include the slits 28k and 28l provided at the connection parts 23k and 23l, respectively. Furthermore, the slits 28k and 28l may be partially provided in the circumferential direction and they may not be necessarily continued in the circumferential direction.

Figure 19:
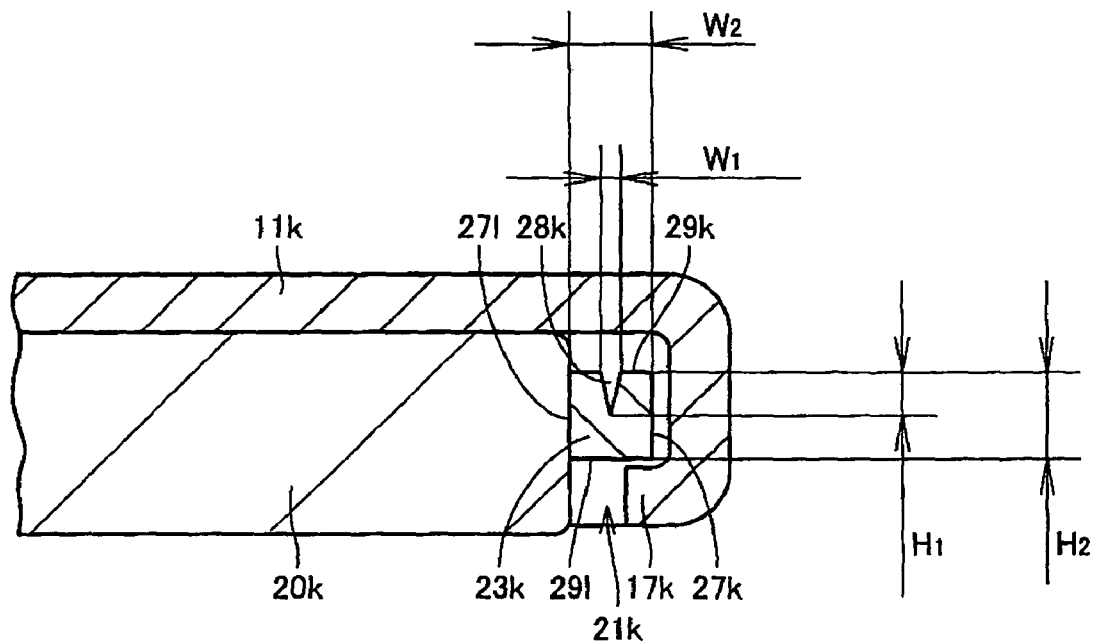
FIG. 19 is an enlarged view showing a part of the rocking bearing shown in FIG. 17.

Here, it is preferable that dimensions of the slit 28k have the following relation. FIG. 19 is an enlarged view showing the slit 28k in the rocking bearing 30k shown in FIG. 17. Referring to FIG. 19, the dimensions are set to have a relation $0.2W_2 < W_1 < 0.8W_2$ wherein $W_1$ represents an axial length of the slit 28k, and $W_2$ represents an axial length of the connection part 23k. In addition, the dimension are set to have a relation $0.2H_2 < H_1 < 0.8H_2$ wherein $H_1$ represents a radial length of the slit 28k, and $H_2$ represents a radial length of the connection part 23k. Here, the axial length $W_1$ of the slit 28k designates a length of the slit 28k on the side of the outer diameter surface 29k, and the length $W_2$ of the connection part 23k designates an axial length from an end face 27k of the connection part 23k to a wall surface 21 of the pocket. In addition, the radial length $H_1$ of the slit 28k designates a length from the outer diameter surface 29k to a radial most recessed part of the slit 28k, and the radial length $H_2$ of the connection part 23k designates a length from the outer diameter surface 29k to an inner diameter surface 29l of the connection part 23k.

Thus, the connection part 23k can be appropriately elastically deformed. That is, when $0.2W_2 < W_1$ and $0.2H_2 < H_1$, the connection part 23k can be elastically deformed and the snap fitting can be implemented appropriately. In addition, when $W_1 < 0.8W_2$ and $H_1 < 0.8H_2$, the connection part 23k can be prevented from being damaged at the time of snap fitting.

Figure 20:
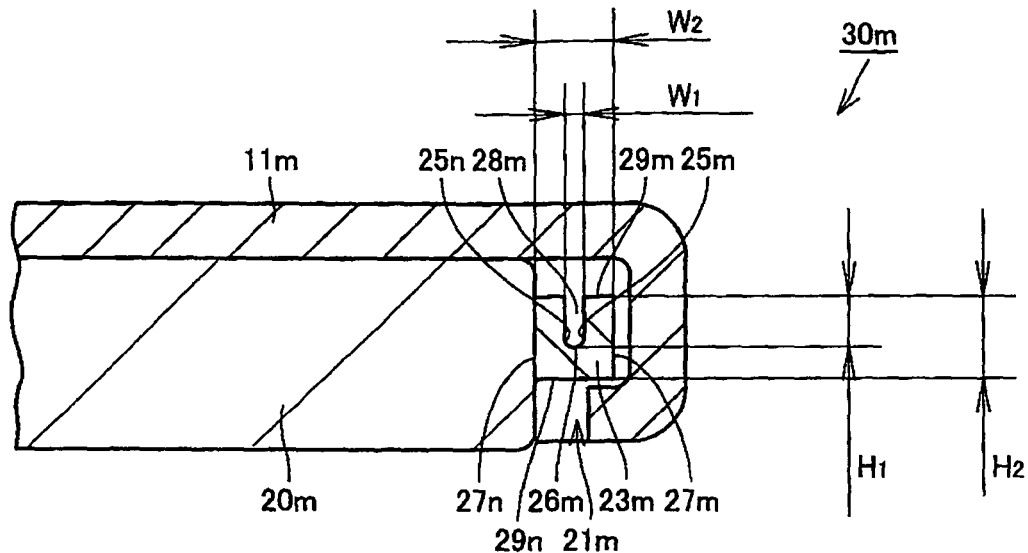
FIG. 20 is an enlarged view showing a part of a rocking bearing according to still another embodiment of the present invention.

In addition, although the slit has the roughly V-shaped section in the above embodiment, it may have another configuration. FIG. 20 is an enlarged sectional view showing a part of a rocking bearing in this case, and corresponds to FIG. 19. Referring to FIG. 20, a rocking bearing 30m has the same constitution as that of the above rocking bearing basically, and includes an outer ring 11m, a roller 20m, and a retainer 21m holding the roller 20m. A connection part 23m of the retainer 21m is provided with a slit 28m. Side wall surfaces 25m and 25n of the slit 28m are roughly parallel to an end face 27m of the connection part 23m, and a bottom part 26m recessed toward the inner diameter side has R section. The slit may be the slit 28m having the above configuration.

Similar to the above, the dimensions have a relation $0.2W_2 < W_1 < 0.8 < W_2$ wherein $W_1$ represents an axial length of the slit 28*m*, and W₂ represents an axial length of the connection part 23*m*. In addition, dimensions have a relation $0.2H_2<H_1<0.8H_2$ wherein $H_1$ represents a radial length of the slit 28*m*, and $H_2$ represents a radial length of the connection part 23*m*. Thus, similar to the rocking bearing shown in FIGS. 17 to 19, the connection part 23*m* can be appropriately elastically deformed. Here, the axial length $W_1$ of the slit 28*m* designates a length between the side wall surfaces 25*m* and 25*n* of the slit 28*m*, and the length $W_2$ of the connection part 23*m* designates an axial length from an end face 27*m* of the connection part 23*m* to a wall surface 27*n* of a pocket. In addition, the radial length $H_1$ of the slit 28*m* designates a length from the outer diameter surface 29*m* to a bottom part 26*m*, and the radial length $H_2$ of the connection part 23*m* designates a length from the outer diameter surface 29*m* to an inner diameter surface 29*n* of the connection part 23*m*.

In addition, in this case also, the slit having the same configuration may be provided at each connection part. In addition, the present invention is not limited to the configurations shown in FIGS. 17 to 20, and may be applied to other various configurations.

Figure 21:
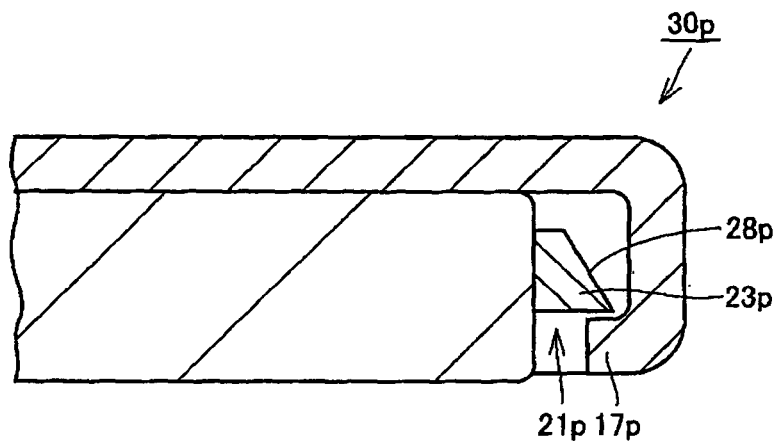
FIG. 21 is an enlarged view showing a part of a rocking bearing according to still another embodiment of the present invention.

Furthermore, as shown in FIG. 21, the snap fitting allowable configuration may include an end face 28*p* of a connection part 23*p* sloped so that its axial length is increased from the outer diameter side to the inner diameter side in a retainer 21*p* contained in a rocking bearing 30*p*. In this case also, the connection part 23*p* can snap-fit in the bent part 17*p*.

Here, for example, the above snap fitting allowable configurations may be combined such that the slit is provided at one connection part and the fitting click is provided at the other connection part in the retainer. In this case, for example, when the slit recessed from the inner diameter surface toward the outer diameter side is provided at the connection part having the end face 28*p* shown in FIG. 21, the snap fitting can be more easily implemented.

Figure 22:
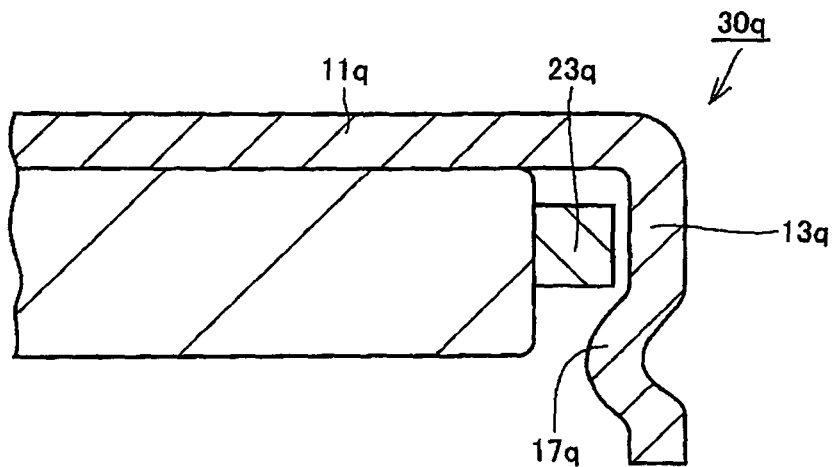
FIG. 22 is an enlarged view showing a part of a rocking bearing according to still another embodiment of the present invention.

In addition, as shown in FIG. 22, the snap fitting allowable configuration may be provided in a bent part 17*q*. The bent part 17*q* provided at the flange part of an outer ring 11*q* in a rocking bearing 30*q* is folded back in the axial direction. In this case, the snap fitting can be implemented between the bent part 17*q* and the connection part 23*q* by elastically deforming the bent part 17*q* in the axial direction.

In addition, as the retainer arranged on the inner diameter side of the outer ring can be circumferentially moved in the above rocking bearing, it is necessary to provide movement restricting means in order to prevent the retainer from dropping out of the outer ring. According to a conventional example, a projection part projecting toward the inner diameter side is provided at a circumferential end of an outer ring and the projection part abuts on a circumferential end of a retainer to restrict the circumferential movement of the retainer. However, according to the movement restricting means, the circumferential movable range of the retainer cannot be provided enough. Meanwhile, according to Japanese Unexamined Patent Publication No. 2003-214330, a control lever is provided in a rocking bearing as a new member, a raceway ring and a retainer are connected so as not to be separated, and both ends of the control lever are fit in a rotation member and a fix member, to restrict the circumferential movement of the retainer. However, according to the Japanese Unexamined Patent Publication No. 2003-214330, since it is necessary to provide the control lever, this is not preferable in view of the aim to reduce cost and the number of components.

Here, for example, in the rocking bearing 30*a* containing the outer ring 11*a* shown in FIG. 1, a click part to abut on and engage with a projection part provided in a retainer that will be described later in the circumferential direction may be provided at both axial ends of the outer ring 11*a* in which the flange parts 13*a* and 13*b* are not provided. In addition, the projection parts may be provided at predetermined positions of axial end faces 27*a* and 27*b* of the connection parts 23*a* and 23*b*.

Figure 23:
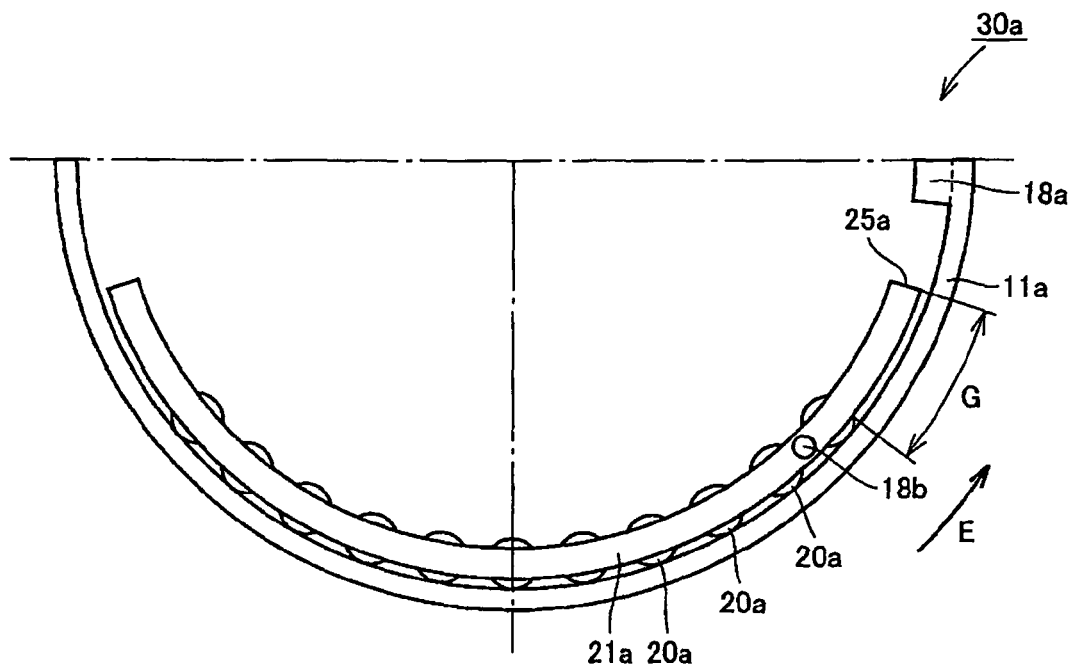
FIG. 23 is a view showing a rocking bearing according to still another embodiment of the present invention taken in an axial direction when a click part does not abut on a projection part.
Figure 24:
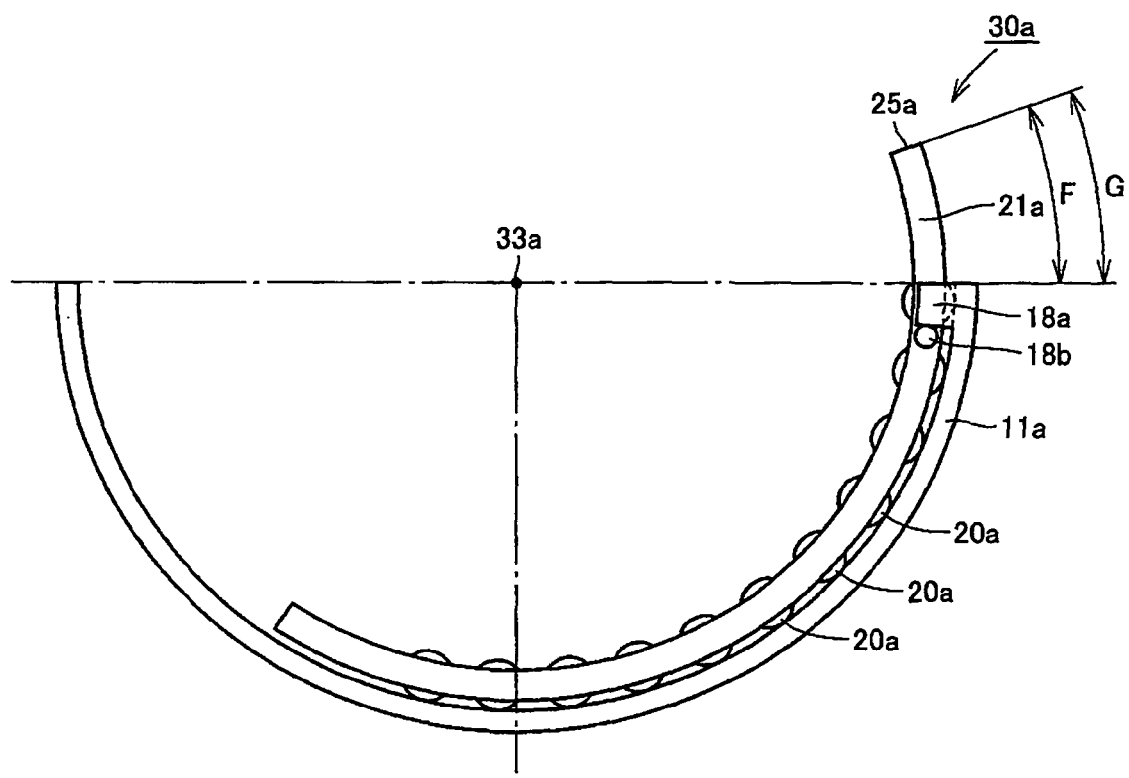
FIG. 24 is a view showing the rocking bearing according to still another embodiment of the present invention taken in the axial direction when the click part abuts on the projection part.

The above will be described with reference to FIGS. 23 and 24. FIGS. 23 and 24 are views showing the rocking bearing 30*a* taken from the axial direction, in which FIG. 23 shows a state in which a click part 18*a* does not abut on a projection part 18*b*, and FIG. 24 shows a state in which the click part 18*a* abuts on the projection part 18*b*. In addition, the flange parts 13*a* and 13*b* are not shown in FIGS. 23 and 24 in view of easy understanding. In addition, since the basic constitutions of the rocking bearing 30*a*, the outer ring 11*a*, the retainer 21*a* are the same as those described above, their description will be omitted.

Referring to FIGS. 23, 24, and 1, the click part 18*a* is provided at the end opposite to the circumferential end in which the projection parts 14*a* and 14*b* are provided. In addition, the click part 18*a* may be provided at the position closer to the end in the flange parts 13*a* and 13*b*. The projection part 18*b* is provided at the position closer to the end 25*a* of the ends 25*a* and 25*b*. In addition, the projection part 18*b* is provided circumferential peripheral inner side as compared to a pocket 22*a* arranged on the circumferential outermost side. In addition, although the projection part 18*b* is combined with the engagement part 26*a* here, the projection part 18*b* and the engagement part 26*a* may be provided separately.

The retainer 21*a* is moved within a predetermined range in the circumferential direction in the outer ring 11*a*. The retainer 21*a* is moved around a rotation center 33*a* in the circumferential direction, that is, a direction shown by an arrow E in FIG. 23 and its opposite direction. Here, when the retainer 21*a* is moved in the circumferential direction, and the projection part 18*b* provided at the predetermined position of the connection part 23*a*, 23*b* abuts on the click part 18*a* provided in the outer ring 11*a*, the retainer 21*a* cannot be moved in the circumferential direction any more.

Thus, the circumferential movement of the retainer 21*a* can be restricted. In other words, after the retainer 21*a* is circumferentially moved in the outer ring 11*a* by the predetermined amount, the click part 18*a* abuts on the projection part 18*b* to limit the movement amount of the retainer 21*a*. According to the rocking bearing 30*a* having the above constitution, the circumferential movement amount of the retainer 21*a* can be optionally determined by the position of the projection part 18*b*. In this case, since the retainer 21*a* can be moved until the projection part 18*b* abuts on the click part 18*a*, its movement range can be largely provided. In addition, according to the rocking bearing 30*a* containing the outer ring 11*a* and the retainer 21*a*, since it is not likely that the retainer 21*a* drops off, its assembling properties is improved. According to the rocking bearing 30*a*, since it is not necessary to provide a new member, its cost can be low.

In addition, since the predetermined position of the projection part 18*b* is on the circumferential inner side of the pocket 22*a* arranged in the circumferential outermost side, and the movement of the retainer 21*a* is limited at the position in which a part of the retainer 21*a* projects from the circumferential one end of the outer ring 11*a*, the movement range of the retainer 21*a* can be further increased within a rolling range of the roller 20*a* held in the pocket 22*a*.

The circumferential length of the retainer 21*a* projecting from the outer ring 11*a* may not be more than the circumferential length from the one end 25*a* of the retainer 21*a* to the pocket 22*a* positioned on the circumferential outermost side on the one end 25a side. More specifically, a length F is to be not more than a length G in FIGS. 23 and 24. Thus, the movement range of the retainer 21a can be further increased. In addition, even when the projection part 18b abuts on the click part 18a, the roller 20a housed in the pocket 22a positioned on the circumferential outermost side does not drop off. Therefore, the roller 20a housed in the pocket 22a arranged on the circumferential outermost side can be prevented from dropping off. According to such rocking bearing 30a, its assembling properties can be further improved.

In addition, the predetermined position of the projection part 18b may be on the circumferential outer side of the pocket 22a provided on the outermost side on the side of the engagement part end 25a. In this case also, the movement range of the retainer 21a can be largely provided.

In addition, the click part 18a and the projection part 18b abutting thereon may be provided on only one axial side. In this case also, the circumferential movement of the retainer 21a can be restricted.

Figure 25:
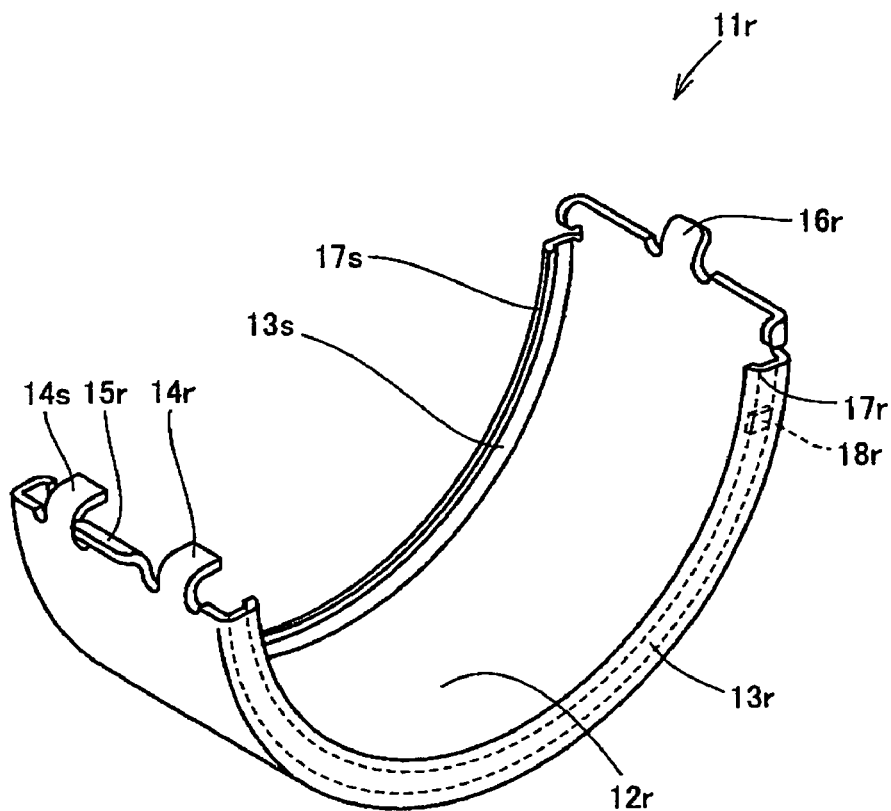
FIG. 25 is a perspective view showing an outer ring for the rocking bearing provided in a rocking bearing according to still another embodiment of the present invention.
Figure 26:
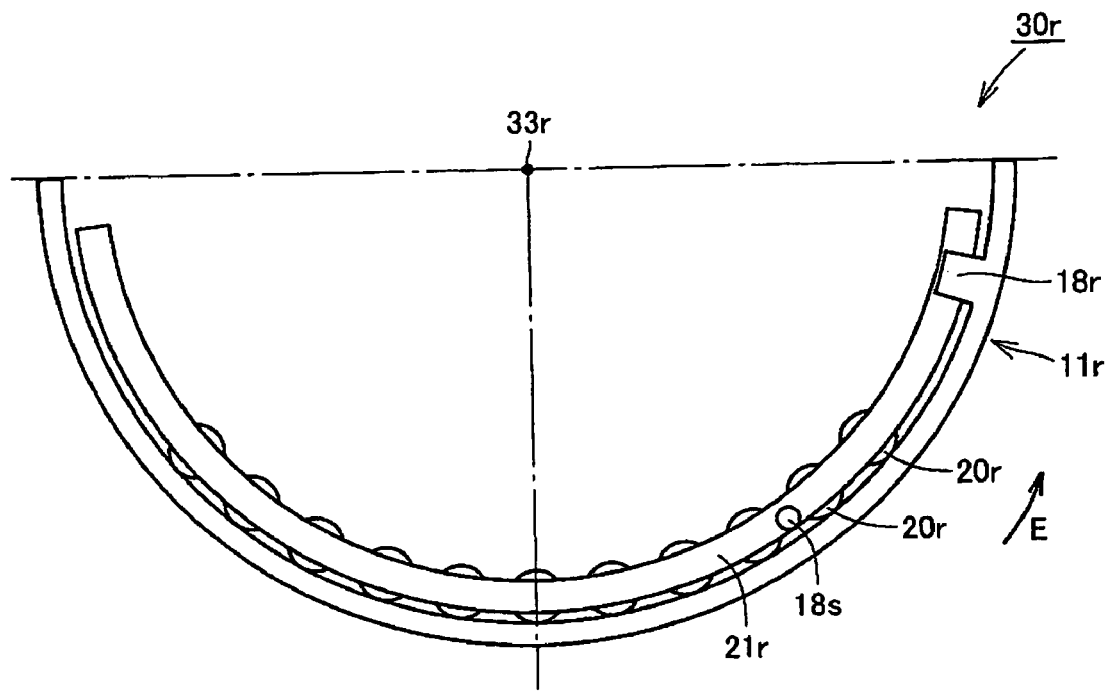
FIG. 26 is a view showing the rocking bearing containing the outer ring for the rocking bearing shown in FIG. 25 taken in the axial direction when a click part does not abut on a projection part.
Figure 27:
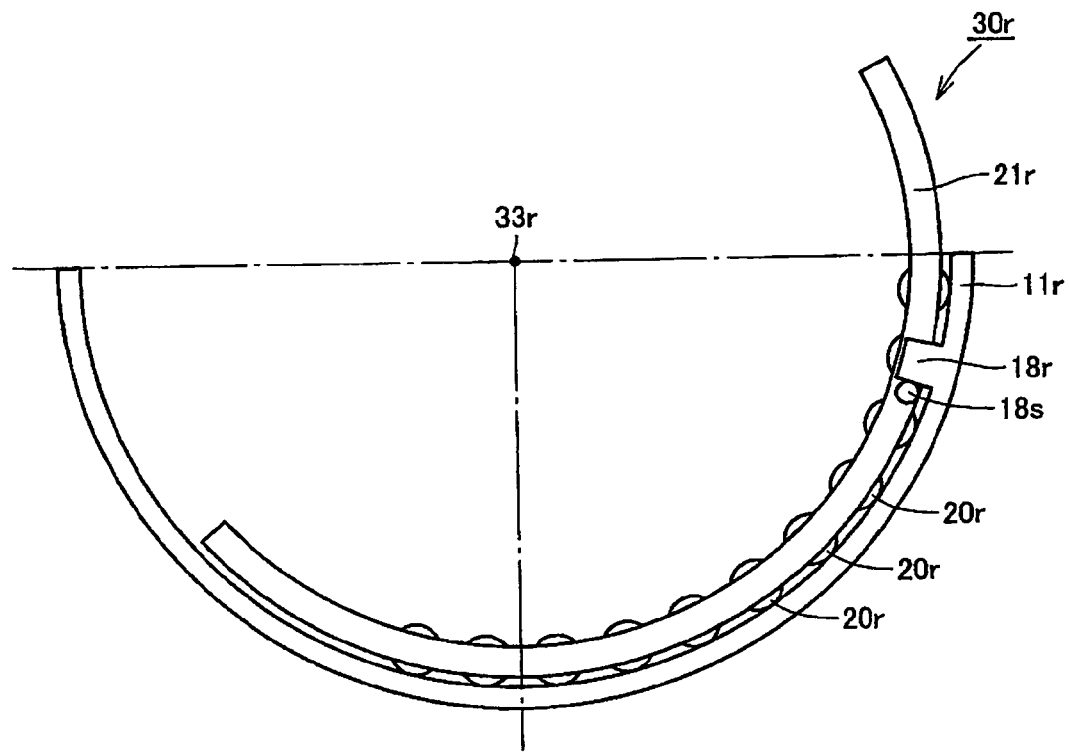
FIG. 27 is a view showing the rocking bearing containing the outer ring for the rocking bearing shown in FIG. 25 taken in the axial direction when the click part abuts on the projection part.

Here, although the click part is provided at the circumferential end of the outer ring in the above embodiment, the click part may be provided at a predetermined position close to the circumferential end of the outer ring. FIGS. 25, 26, and 27 show an outer ring and a rocking bearing in this case, and correspond to FIGS. 1, 23, and 24, respectively. Referring to FIGS. 25 to 27, a constitution of an outer ring 11r is basically the same as that of the outer ring 11a shown in FIG. 1, and the outer ring 11r has a raceway surface 12r, flange parts 13r and 13s, projection parts 14r and 14s, protrusions 15r and 16r, and bent parts 17r and 17s. A retainer 21r is circumferentially moved around a rotation center 33r. Here, a click part 18r is provided at a predetermined position close to its circumferential end. In addition, the click part 18r is provided on the side of the raceway surface 12r of the flange parts 13r and 13s. In this case also, the movement range of the retainer 21r can be largely provided.

The above outer ring is produced by the following production method. As a starting material, carbon steel containing 0.5 to 1.1% by weight of carbon is used. More specifically, SK5, SUJ2, and SAE1070 containing 0.5 to 1.1% by weight of carbon (all of them comply with JIS) may be used.

Figure 28:
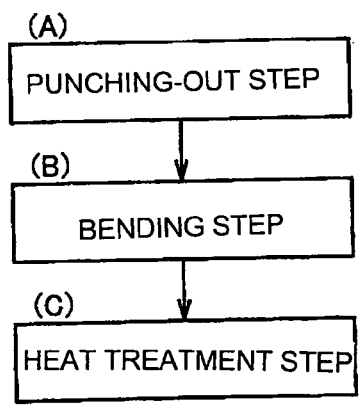
FIG. 28 is a flowchart showing representative production steps of the outer ring for the rocking bearing.

FIG. 28 is a flowchart showing representative production steps of the outer ring. Referring to FIG. 28, a steel plate of the above starting material is punched out (FIG. 28(A)). Then, the flange part is formed by a bending process, whereby an outline configuration of the outer ring is formed (FIG. 28(B)). This bending step is implemented by a pressing process. In this case, since the above material having the above carbon content is used, that is, since the material containing 1.1% or less by weight of carbon is used, its processability is preferable, so that the outline configuration of the outer ring can be formed with high accuracy. In addition, since the bending process is performed by the pressing process, the outline configuration of the outer ring can be formed at low cost.

Then, a heat treatment is performed (FIG. 28(C)). Here, a bright quenching treatment or high-frequency quenching treatment is performed as the heat treatment. In this case, since the material containing 0.5% or more of carbon is used, hardness required for the outer ring, that is, hardness of Hv653 or more can be provided by the bright quenching treatment or the high-frequency quenching treatment. Accordingly, a carburized quenching treatment is not needed. Therefore, the outer ring is not likely to be prevented from being deformed and the outline configuration of the outer ring can be maintained with high accuracy.

Here, the bright quenching treatment means a quenching treatment in which the steel is heated in a protective atmosphere or vacuum while its surface is prevented from being oxidized. This quenching treatment is low in facility cost. Therefore, the production cost can be low.

The high-frequency quenching treatment is a method for producing a hardened layer by heating a steel surface rapidly by use of induction heating and then cooling rapidly. This quenching treatment is also low in facility cost. Therefore, production cost can be also low. In addition, since a gas is not needed in the heat treatment step, it has an advantage of being environment-friendly. Furthermore, the quenching treatment can be partially performed.

Furthermore, it is preferable to perform a tempering treatment after the above quenching treatment to reduce a residual stress and internal distortion generated in the quenching treatment, and to improve the toughness and stabilize the dimension.

In addition, after the heat treatment, a polishing process for polishing the object is performed and then a cleaning process is performed, whereby a final product is provided. In addition, the rollers and the retainer are assembled in the above outer ring produced as described above, whereby the rocking bearing is completed.

As described above, the outline configuration can be formed by the pressing process with high accuracy. In addition, the hardness required for the outer ring can be provided by the bright quenching treatment or the high-frequency quenching treatment as the heat treatment. Thus, the deformation can be prevented at the time of heat treatment. Therefore, the outer ring is high in accuracy, low in cost, and high in load capacity. Furthermore, since not only the raceway surface but also the bent part can be high in hardness, the bent part is prevented from being damaged. Therefore, the retainer and the roller can be more surely prevented from dropping off.

In addition, the above outer ring may be produced by the following production method. As a starting material, carbon steel containing 0.15% to 1.1% by weight of carbon is used. More specifically, SCM415 and S50C containing 0.15% to 0.5% by weight of carbon (both comply with JIS) or SAE1070 and SK5 containing 0.5% to 1.1% by weight of carbon (both comply with JIS) may be used.

Referring to FIG. 28 again, the steel plate of the starting material is punched out (FIG. 28(A)). Then, the flange part is bent by the bending process, whereby the outline of the outer ring is formed (FIG. 28(B)). Then, the above heat treatment is performed (FIG. 28(C)). Then, the polishing process is performed and the cleaning process is performed, whereby the final product is completed.

Here, as the heat treatment, carbonitriding treatment is performed. When the carbonitriding treatment is performed on the material containing 0.15 to 1.1% by weight of carbon, the outer ring having the required hardness can be produced at low cost. That is, since the outer ring has high load capacity, it is hardly damaged. In addition, since the strength of the bent part can be high, the retainer and the roller can be more surely prevented from dropping off.

As another heat treatment, a carburizing treatment may be performed. The carburizing treatment is a heat treatment using a phenomenon in which carbon is soluble in high-temperature steel, by which while the carbon content is low inside the steel, the carbon content is high in a surface layer (hardened layer). Thus, the carburized material has a hard surface but its inside is soft and high in toughness. In addition, according to such quenching treatment, its facility cost is low.

Furthermore, it is preferable to perform a tempering treatment after the above quenching treatment to reduce the residual stress and internal distortion generated in the quenching treatment, and to improve the toughness and stabilize the dimension.

In addition, the outer ring and/or the roller may have a nitrogen enrichment layer, and an austenite grain size number of 10 or more, and contains 11% to 25% by volume of retained austenite and 0.1% to 0.7% by weight of nitrogen. In this constitution, the rocking bearing features a long life.

When a low-temperature secondary quenching treatment as the heat treatment to be described below is performed on the outer ring and/or the roller in the rocking bearing, the outer ring and/or the roller can have an austenite grain size number in the nitrogen enrichment layer that exceeds 10, and contains 11% to 25% by volume of retained austenite and 0.1% to 0.7% by weight of nitrogen.

Figure 29:
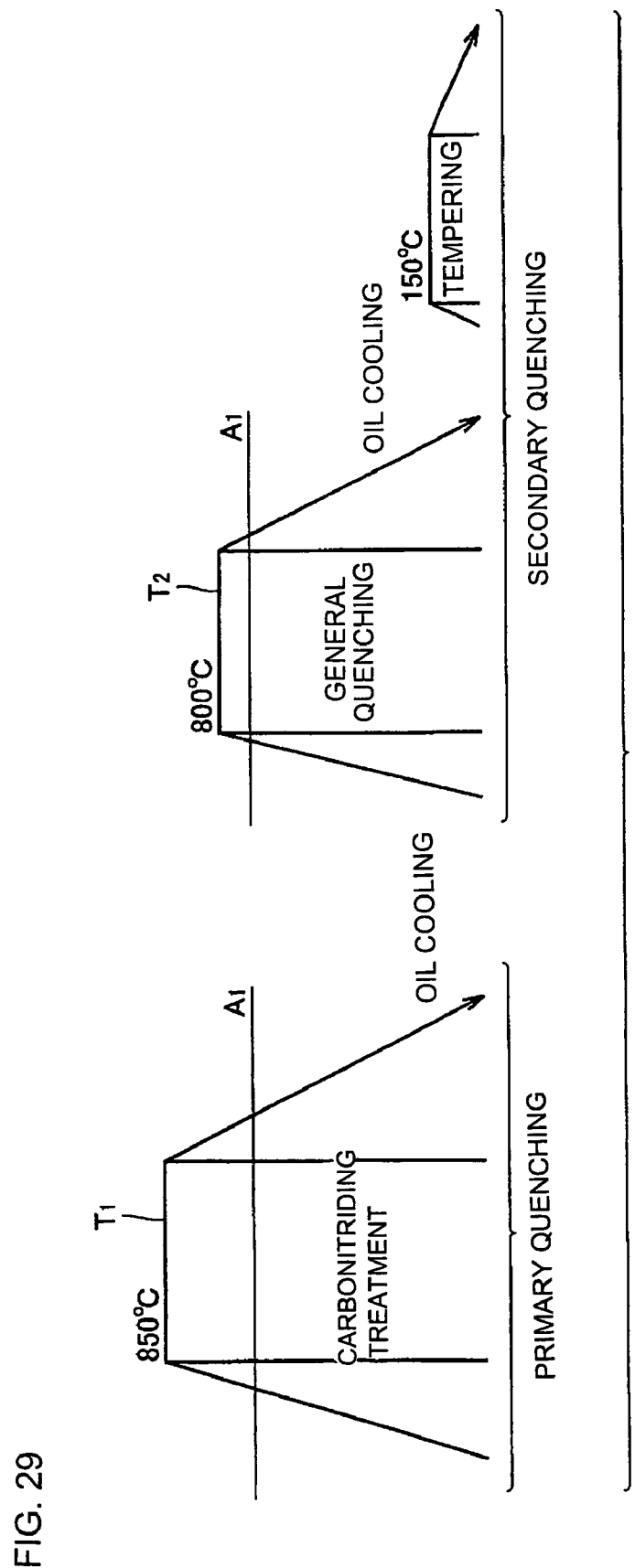
FIG. 29 is a view explaining a two-stage heat treatment method.
Figure 30:
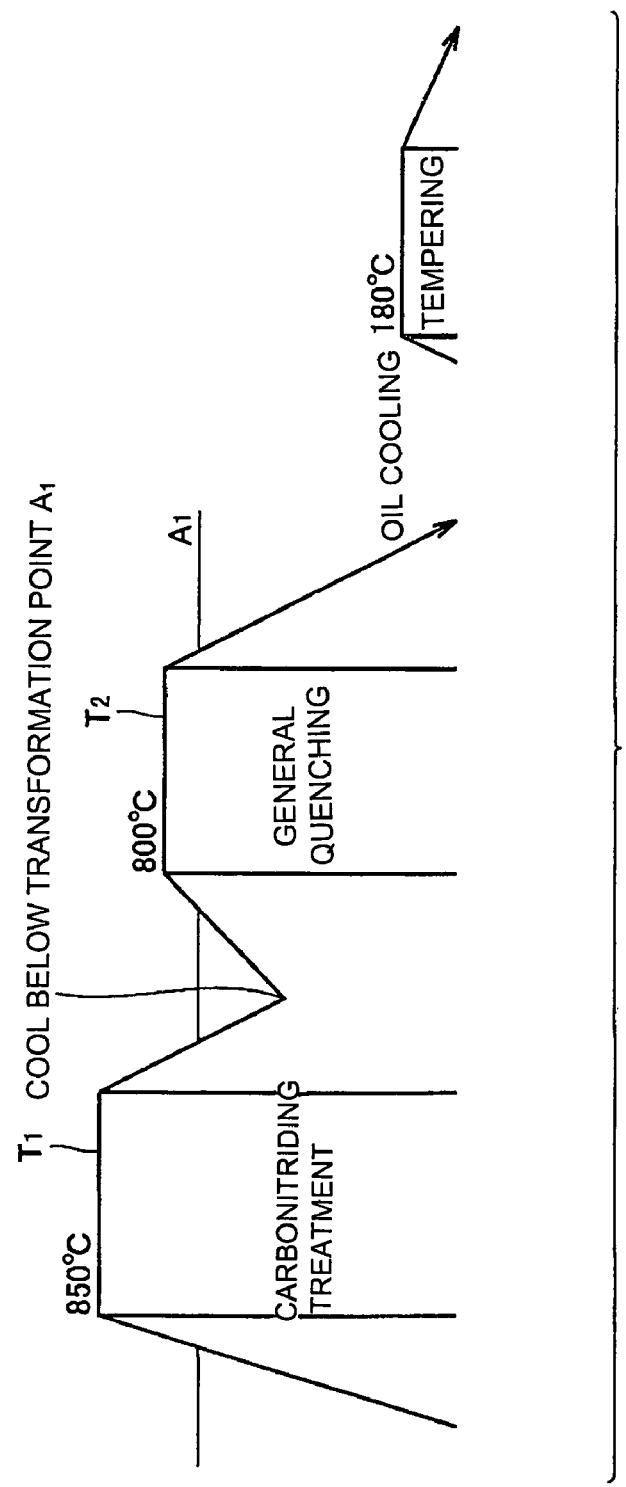
FIG. 30 is a view explaining a variation of the two-stage heat treatment method.

Next, a description will be made of the heat treatment including the carbonitriding treatment performed on the outer ring and/or the roller. In addition, a roller bearing having a roller (outer ring), a roller shaft (inner ring), and rollers as bearing components, is used in a working example. FIG. 29 is a view showing one example of a two-stage heat treatment to obtain the above bearing components. In addition, FIG. 30 is a view showing a variation of the two-stage heat treatment shown in FIG. 29. Thus, FIG. 29 shows a heat treatment pattern in which a primary quenching treatment and a secondary quenching treatment are performed, and FIG. 30 shows a heat treatment pattern in which a material is cooled below the transformation temperature of $A_1$ during the quenching treatment and then heated again to be quenched at a final stage. In either case, the above bearing components can be produced. In these drawings, carbon and nitrogen are diffused and carbon is sufficiently dissolved in a steel base in a treatment $T_1$, and then the steel base is cooled below the transformation temperature $A_1$. Then, in a treatment $T_2$, the steel is heated again to the temperature lower than that in the treatment $T_1$, and then subjected to an oil quenching treatment. In addition, the heat treatment methods shown in FIGS. 29 and 30 are called the two-stage heat treatment collectively.

According to the above heat treatment, while the surface layer is carbonitrided, cracking strength can be improved and an aging length change rate can be reduced as compared with the general quenching treatment in which the quenching treatment is performed one time after the carbonitriding treatment. Through the above heat treatment method, a microstructure in which the austenite grain size can be less than half the conventional one can be provided. According to the bearing component subjected to the above heat treatment, rolling fatigue characteristics has a long life, the cracking strength is improved and the aging length change rate can be reduced.

Figure 31:
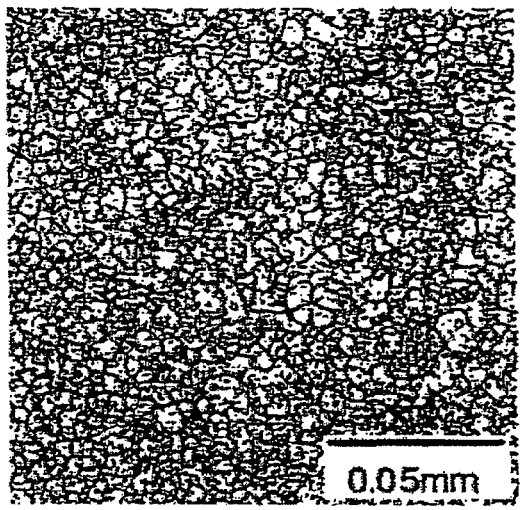
FIG. 31 is a view showing microstructure, austenite grains especially in a bearing component subjected to a heat treatment pattern shown in FIG. 29.
Figure 32:
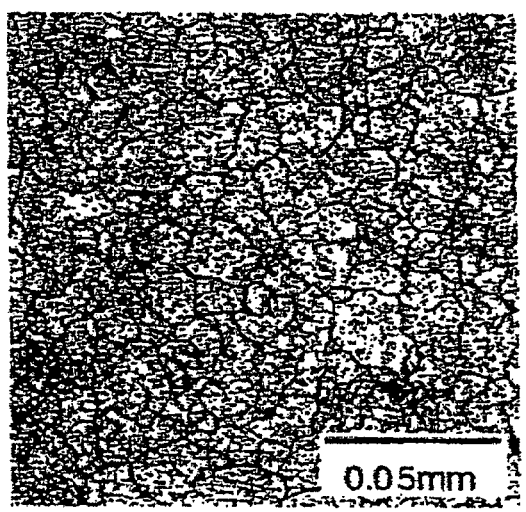
FIG. 32 is a view showing microstructure, austenite grains especially in a conventional bearing component.
Figure 33:
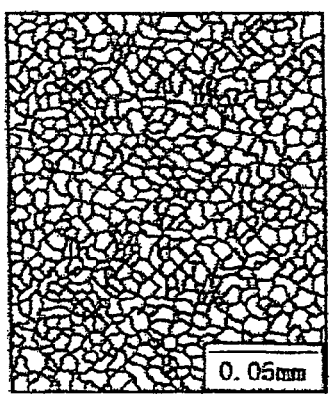
FIG. 33 is a schematic diagram of the microstructure shown in FIG. 31 in which an illustrated austenite grain boundary is shown.
Figure 34:
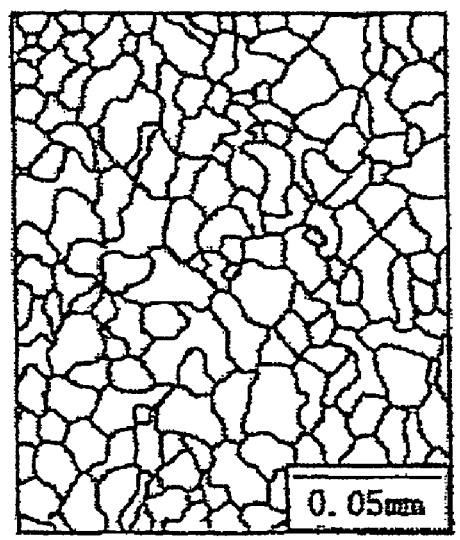
FIG. 34 is a schematic diagram of the microstructure shown in FIG. 32 in which an illustrated austenite grain boundary is shown.

FIGS. 31 and 32 show the microstructures of the austenite grains of the bearing components. FIG. 31 shows a bearing component subjected to the above heat treatment, and FIG. 32 shows a conventional bearing component. More specifically, FIG. 31 shows the austenite grain size of bearing steel subjected to the heat treatment pattern shown in FIG. 30. In addition, for comparison, FIG. 32 shows the austenite grain size of the bearing steel subjected to a conventional heat treatment method. In addition, FIGS. 33 and 34 are views showing illustrated austenite grain boundaries of FIGS. 31 and 32, respectively. According to the structure of the austenite grain size, the austenite grain size number according to JIS standard is 10 or less in the case of the conventional treatment, and the number is 12 in the case of the above two-stage heat treatment. In addition, an average grain size in FIG. 31 measured by a section method is 5.6 μm.

The working example will be described hereinafter. A roll, a roll shaft, and a roller were produced by the three kinds of heat treatments such as a standard heat treatment, a carbonitriding treatment, and a two-stage heat treatment. The standard heat treatment, the carbonitriding treatment, and the two-stage heat treatment are the following heat treatments.

The standard heat treatment: After a heat treatment at a heating temperature of 840° C. for a retention time of 20 minutes in a RX gas atmosphere, a quenching treatment was performed and then a tempering treatment was performed at 180° C. for 90 minutes.

Carbonitriding treatment: After a heat treatment at a heating temperature of 850° C. for a retention time of 150 minutes in a RX-ammonia mixture gas atmosphere, a quenching treatment was performed from a temperature of 850° C. and then a tempering treatment was performed at 180° C. for 90 minutes.

Two-stage heat treatment: A carbonitriding treatment was performed at a carbonitriding treatment temperature of 850° C. for a retention time of 150 minutes. The carbonitriding treatment was performed in a RX-ammonia mixture gas atmosphere. Then, based on the heat treatment pattern shown in FIG. 29, the primary quenching was performed at the carbonitriding treatment temperature of 850° C., and the secondary quenching was performed at a temperature of 800° C. lower than the carbonitriding treatment temperature, for 20 minutes, and a tempering treatment was performed at 180° C. for 90 minutes.

Table 1 shows qualities of the members provided by the above heat treatments.

TABLE 1

| HEAT TREATMENT METHOD | AUSTENITE GRAIN SIDE (JIS) | RETAINED AUSTENITE VOLUME (% BY VOLUME) | NITROGEN CONTENT (% BY WEIGHT) |
|---|---|---|---|
| STANDARD HEAT TREATMENT | 9 | 7 | 0 |
| CARBONITRIDING TRATMENT | 8 | 29 | 0.31 |
| TWO-STAGE HEAT TREATMENT | 12 | 21 | 0.30 |

A description will be made of methods for examining material qualities.

Austenite grain size: The austenite grain size was measured based on an austenite grain size testing method for steel of JIS G 0551.

Retained austenite volume: The retained austenite volume was measured by comparing the diffraction intensity of martensite α (211) with that of retained austenite γ (220). As the retained austenite volume, the value at a surface layer of 50 μm from a rolling surface after ground was used.

Nitrogen content: The nitrogen content was measured by use of EPMA. As the nitrogen content, a value at a surface layer of 50 μm from the rolling surface after ground was used.

Next, the test result shown in Table 1 will be described.

Austenite grain size: The grain size number of the member through the two-stage heat treatment is as fine as 12, which is considerably miniaturized. The grain size numbers of the member through the standard heat treatment and the member through the carbonitriding treatment are 9 and 8, respectively and the austenite grains are larger than that of the member through the two-stage heat treatment.

Retained austenite volume: The retained austenite volume of the member through the two-stage heat treatment is 21% by volume and austenite exists appropriately. Meanwhile, the retained austenite volume of the member through the standard heat treatment is 7% by volume which is less than that of the member through the two-stage heat treatment. In addition, the retained austenite volume of the member through the carbonitriding treatment is 29% by volume which is more than that of the member through the two-stage heat treatment. As a result, it can be understood that the member through the two-stage heat treatment is intermediate in retained austenite volume between the member through the standard heat treatment and the member through the carbonitriding treatment.

Nitrogen content: The nitrogen content of the member through the two-stage heat treatment is 0.30%. The nitrogen content of the member through the standard heat treatment is 0% because the carbonitriding treatment is not performed. In addition, the nitrogen content of the member through the carbonitriding treatment is 0.31%. The nitrogen content of the member through the two-stage heat treatment is a little less than that of the member through the carbonitriding treatment. This is attributed to the fact that the secondary quenching treatment was performed at 800° C. lower than the carbonitriding treatment temperature after the carbonitriding treatment in the two-stage heat treatment.

Figure 35:
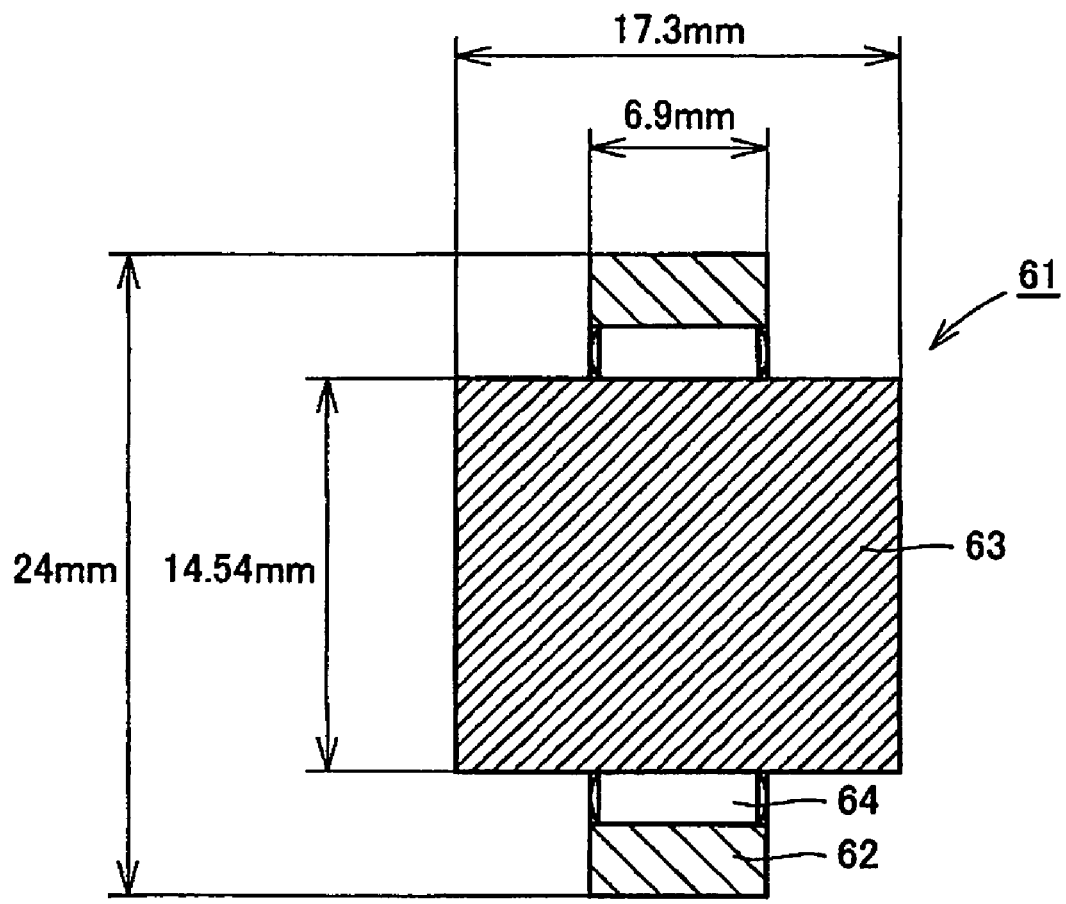
FIG. 35 is a sectional view showing structures (dimensions) of samples 1 to 6.
Figure 36:
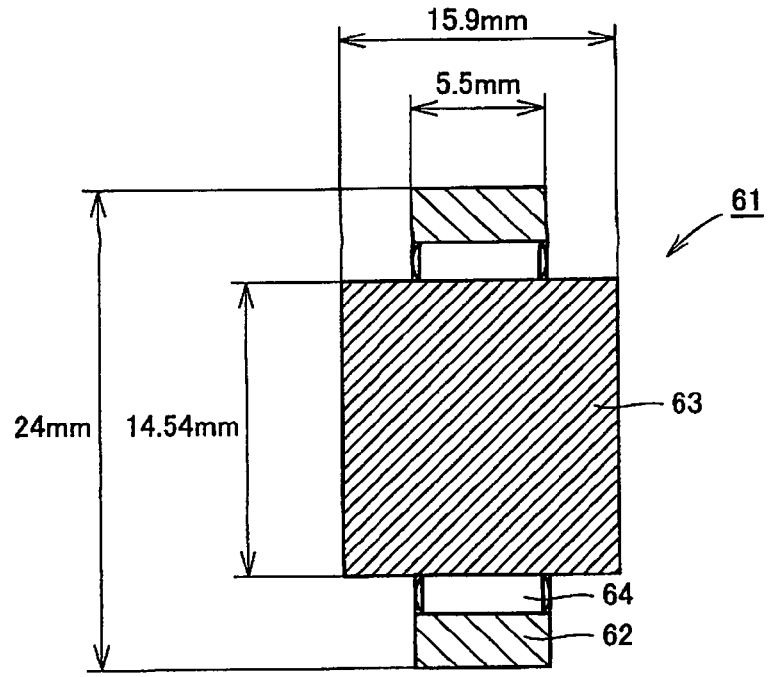
FIG. 36 is a sectional view showing structures (dimensions) of samples 7 to 11.

Then, roller bearings are made up of various combinations of the roll, the roll shaft, and the rollers produced by the above three kinds of heat treatments, as samples 1 to 11. FIG. 35 is a sectional view showing the structures (dimensions) of the samples 1 to 6. FIG. 36 is a sectional view showing the structures (dimensions) of the samples 7 to 11. As shown in FIG. 35, according to the samples 1 to 6, a roll 62 and roller 64 are 6.9 mm in width, and a roll shaft 63 is 17.3 mm in width.

Meanwhile, as shown in FIG. 36, according to the samples 7 to 11, the roll 62 and the roller 64 are 5.5 mm in width, and the roll shaft 63 is 15.9 mm in width. That is, the samples 7 to 11 are reduced in size by about 20% as compared with the samples 1 to 6.

Figure 37:
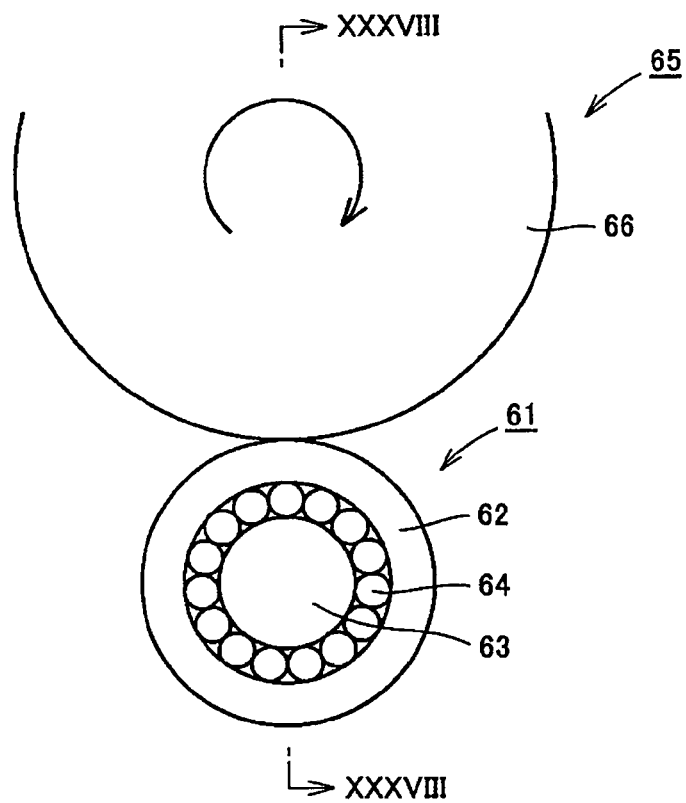
FIG. 37 is a front view showing an essential part of a peeling life test machine.
Figure 38:
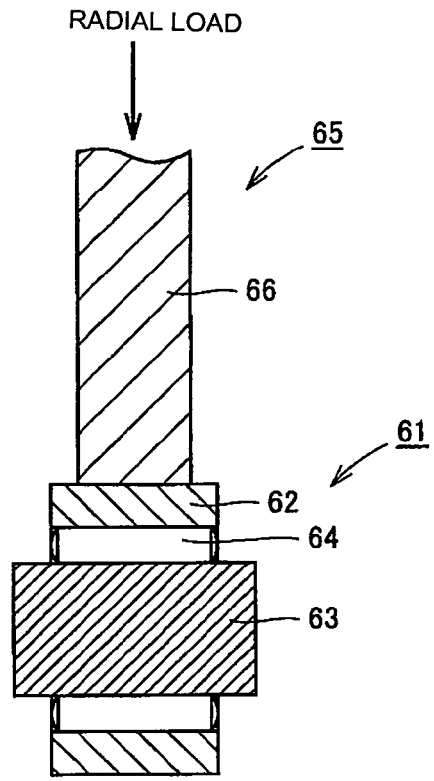
FIG. 38 is a sectional view taken along line XXXVIII-XXXVIII in FIG. 37.

Then, a peeling life test was performed on the samples 1 to 11 by the following method. FIG. 37 is a front view showing an essential part of a peeling life test machine 65, and FIG. 38 is a sectional view taken along a line XXXVIII-XXXVIII in FIG. 37. As shown in FIGS. 37 and 38, a roller bearing 61 is arranged so that a driving roll 66 of the peeling life test machine 65 is brought in contact with the roll 62 to fix the roller shaft 63. Thus, under the condition that a radial load was applied from the driving roll 66 of the peeling life test machine 65, the driving roll 66 was rotated in a direction shown by an arrow in FIG. 37 to rotate the roll 62. A time (life) to occurrence of peeling in any one of the roll 62, the roll shaft 63, and the roller 64 was measured. In addition, the load applied from the driving roll 66 to the roller bearing 61 was set to 2.58kN, and the rotation speed of the roll 62 was set to 7000r/min. In addition, as lubricant oil between the roller 64, and the roll 62 and the roll shaft 63, 10W-30 engine oil was used and the temperature of the lubricant oil was set to 100° C.

Tables 2 and 3 show the combinations of the members of the samples and the peeling lives of the samples. The samples 6, 9 10 and 11 were subjected to the two-stage heat treatment. In addition, the peeling lives of the samples are shown assuming that the peeling life of the sample 1 is set to 1.

TABLE 2

| SAMPLE NO. | 1 | 2 | 3 | 4 | 5 | 6 |
|---|---|---|---|---|---|---|
| SAMPLE WIDTH | | | | 6.9 (mm) | | |
| OUTER RING (ROLL) | STANDRAD HEAT TREATMENT | | CARBONITRIDING TREATMENT | | STANDRAD HEAT TREATMENT | TWO-STAGE HEAT TREATMENT |
| ROLLER (ROLLING BODY) | STANDRAD HEAT TREATMENT | | CARBONITRIDING TREATMENT | | TWO-STAGE HEAT TREATMENT | |
| INNER RING (ROLL SHAFT) | STANDRAD HEAT TREATMENT | | CARBONITRIDING TREATMENT | | TWO-STAGE HEAT TREATMENT | |
| LOAD | | | | 2.58 (kN) | | |
| DAMAGED MEMBER | SHAFT AND ROLLER | SHAFT | SHAFT | SHAFT | SHAFT | SHAFT |
| PEELING LIFE | 1 | 1.3 | 1.7 | 1.9 | 2.8 | 3.5 |

TABLE 3

| SAMPLE NO. | 7 | 8 | 9 | 10 | 11 |
|---|---|---|---|---|---|
| SAMPLE WIDTH | | | 5.5 (mm) | | |
| OUTER RING (ROLL) | STANDRAD HEAT TREATMENT | | | CARBONITRIDING TREATMENT | |
| ROLLER (ROLLING BODY) | CARBONITRIDING TREATMENT | TWO-STAGE HEAT TREATMENT | | CARBONITRIDING TREATMENT | TWO-STAGE HEAT TREATMENT |
| INNER RING (ROLL SHAFT) | CARBONITRIDING TREATMENT | | | TWO-STAGE HEAT TREATMENT | |
| LOAD | | | 2.58 (kN) | | |
| DAMAGED MEMBER | OUTER RING | SHAFT | SHAFT | SHAFT | SHAFT |
| PEELING LIFE | 0.8 | 1.1 | 1.2 | 1.5 | 1.7 |

As shown in Table 2, according to the sample 6 in which all of the roll 62, the roll shaft 63, and the roller 64 were subjected to the two-stage heat treatment, the peeling life is 3.5 times as long as the sample 1 in which all of the members were subjected to the standard heat treatment. In addition, as shown in Table 3, even when the bearing is reduced in size, the sample 9 in which the roll 62 and the roll shaft 63 were subjected to the carbonitriding treatment and the roller 64 was subjected to the two-stage heat treatment has a peeling life that is 1.2 times as long as the sample 1. In addition, the sample 10 in which the roll 62 and the roller 64 were subjected to the carbonitriding treatment, and the roll shaft 63 was subjected to the two-stage heat treatment has a peeling life that is 1.5 times as long as the sample 1. Furthermore, the sample 11 in which the roll 62 was subjected to the carbonitriding treatment, and the roller 64 and the roll shaft 63 were subjected to the two-stage heat treatment has a peeling life that is 1.7 times as long as the sample 1. As a result, it can be understood that each of the roll 62, the roll shaft 63, and the roller 64 has the nitrogen enrichment layer, and when the roll 62 and/or the roller 64 are subjected to the two-stage heat treatment, the life can be elongated while the bearing can be reduced in size.

Therefore, the rocking bearing composed of the outer ring and the roller having the same constitutions as above has a longer peeling life. Therefore, the long life can be achieved.

Figure 39:
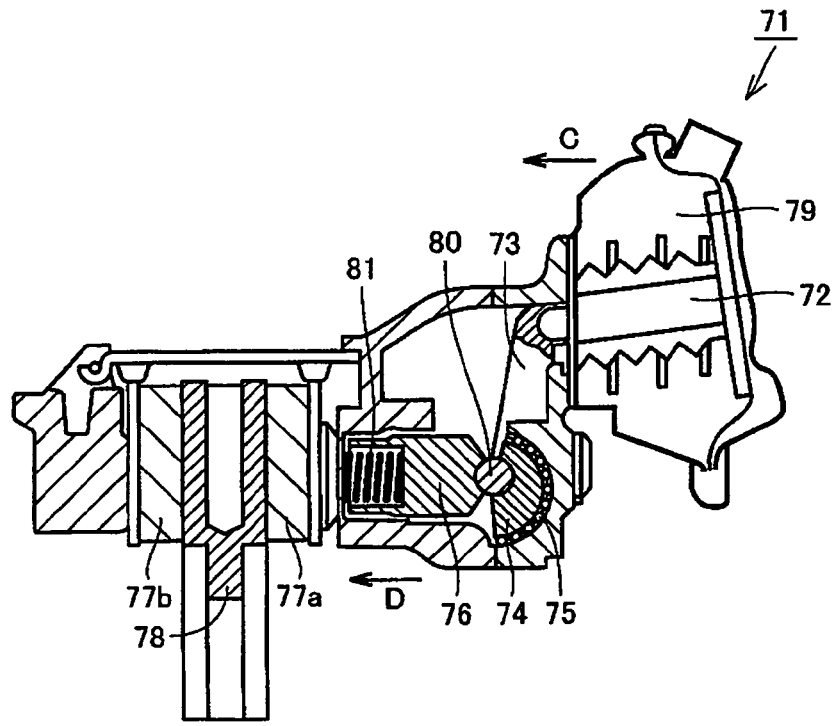
FIG. 39 is a schematic sectional view showing a part of an air disk brake system according to one embodiment of the present invention.
Figure 40:
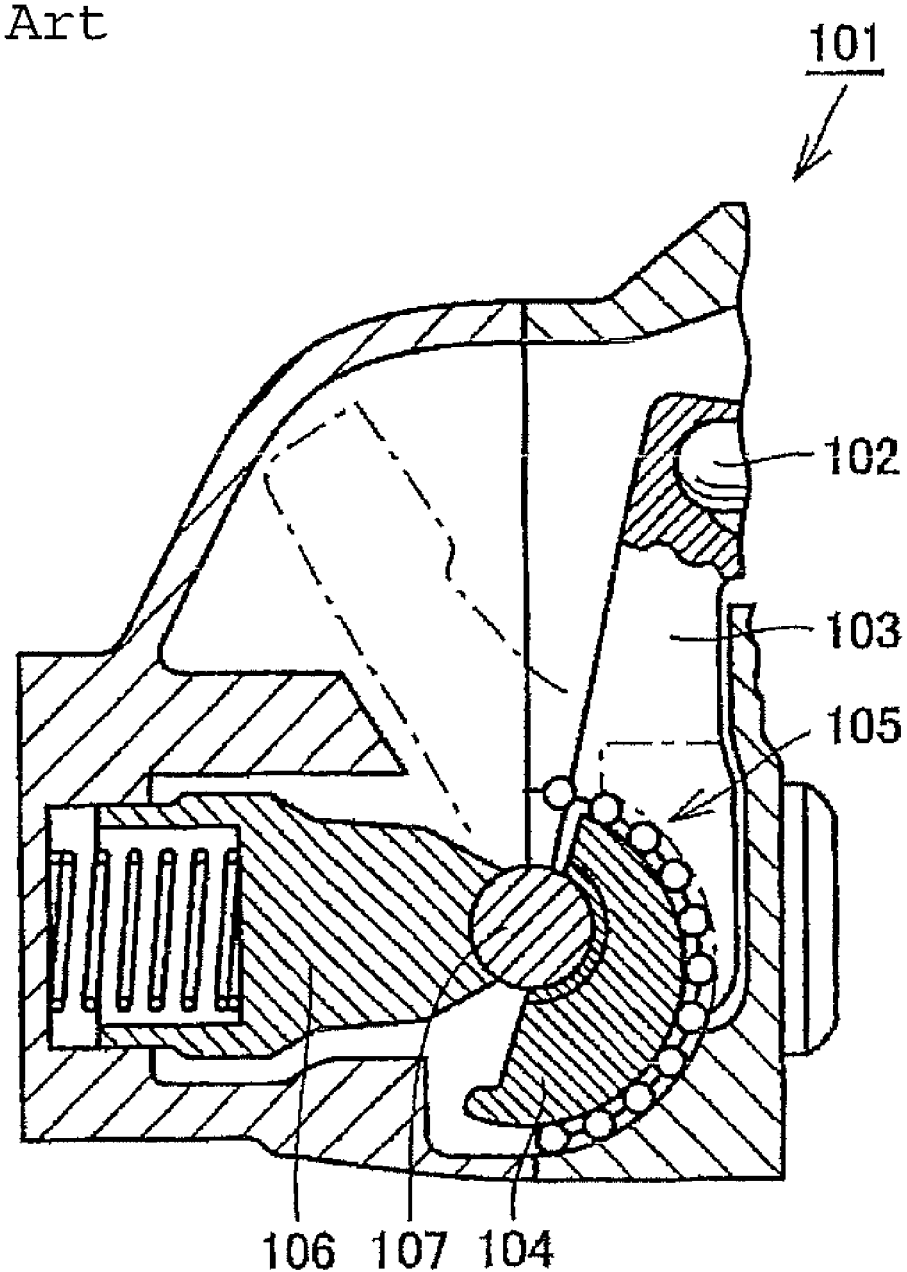
FIG. 40 is a schematic sectional view showing a part of a conventional air disk brake system.

Next, a brief description will be made of a constitution of the air disk brake system having the above-described rocking bearing. FIG. 39 is a schematic sectional view showing a part of the air disk brake system according to one embodiment of the present invention. Referring to FIG. 39, an air disk brake system 71 includes a brake cylinder 79 having an actuator rod 72, a lever 73 connected to one end of the actuator rod 72, a rotation member 74 connected to the other end of the lever 73, a rocking bearing 75 rotatably supporting the rotation member 74, a connection part 80 provided at an eccentric position with respect to the rotation member 74, a transmission part 76 having one end connected to the connection part 80, right and left brake pads 77a and 77b working with the transmission part 76, and a rotor 78 arranged between the right and left brake pads 77a and 77b.

The actuator rod 72 pushes the lever 73 in a direction shown by an arrow C in FIG. 39 by the action of compressed air in the brake cylinder 79. Thus, the rotation member 74 is rotated and the transmission part 76 connected to the connection part 80 is pressed in a direction shown by an arrow D in FIG. 39. Then, when the transmission part 76 is moved, the right and left brake pads 77a and 77b sandwich the rotor 78. In addition, when the load from the rotation member 74 is removed, the transmission part 76 receives force applied from a spring 81 in a direction opposite to the direction shown by the arrow D, and the transmission part 76 is returned to the original position. Thus, the brake pads 77a and 77b release the rotor 78. Thus, the air disk brake system 71 are constituted.

Here, the rocking bearing 75 rotatably supporting the rotation member 74 has the same constitution as the above shown in FIG. 5. According to the rocking bearing 75, after assembled by arranging a retainer holding rollers, on the inner diameter side of an outer ring, the retainer is held so as to be enfolded by a bent part, so that the roller and the retainer can be prevented from dropping out of the outer ring. In addition, at the time of assembling, the roller and the retainer can be prevented from being separated and shifted. Therefore, the assembling properties of the rocking bearing 75 are improved.

Since the air disk brake system 71 contains the rocking bearing 75 having preferable assembling properties, its productivity can be improved.

Furthermore, the air disk brake system 71 may have any one of the above-described rocking bearings.

In addition, although the outer ring is formed into the final outline configuration by punching out the steel plate in the above embodiments, it may be produced by a cutting process.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The outer ring according to the present invention can be effectively used in the rocking bearing requiring preferable assembling properties.

The rocking bearing according to the present invention can be effectively used when preferable assembling properties are required.

The air disk brake system according to the present invention can be effectively used when productivity is required to be improved.

The invention claimed is:

1. A rocking bearing comprising:
an outer ring for the rocking bearing, wherein the outer ring includes a raceway surface on an inner diameter side and a configuration provided by splitting a cylinder member at two circumferential points, the outer ring further comprising a flange part provided by bending each axial end to the inner diameter side,
a plurality of rollers arranged on said raceway surface; and
a retainer containing pockets to hold said rollers and a pair of connection parts positioned on each axial end of said pockets and continued in a circumferential direction, wherein
at least one said flange part is provided with a bent part axially bent toward said raceway surface side so as to enfold the retainer arranged on the inner diameter side; and further wherein a projection part is provided at a predetermined position of an axial end face of said connection part, and a click part is provided at said outer ring for the rocking bearing to limit the movement amount of said retainer by abutting on said projection part after said retainer is moved a predetermined amount in a circumferential direction with respect to said outer ring for the rocking bearing, the click part being provided on an inner side of the flange part of the outer ring facing the raceway surface.

2. The rocking bearing according to claim 1, wherein said bent part is provided so as to be continued in a circumferential direction of said flange part.

3. The rocking bearing according to claim 1, wherein said bent part is provided along each said flange part.

4. The rocking bearing according to claim 1, wherein a material containing 0.15 to 1.1% by weight of carbon is subjected to a carbonitriding treatment to produce said outer ring for the rocking bearing.

5. The rocking bearing according to claim 1, wherein the material of said outer ring for the rocking bearing contains 0.5 to 1.1% by weight of carbon.

6. The rocking bearing according to claim 5, wherein said outer ring for the rocking bearing is subjected to a bright quenching treatment.

7. The rocking bearing according to claim 5, wherein
said outer ring for the rocking bearing is subjected to a high-frequency quenching treatment.

8. The rocking bearing according to claim 1, wherein
an engagement part engaging with said bent part is provided at said connection part.

9. The rocking bearing according to claim 1, wherein
said outer ring for the rocking bearing and/or said roller have a nitride enrichment layer, and an austenite grain size number exceeding 10, and contains 11% to 25% by volume of retained austenite, and 0.1% to 0.7% by weight of nitrogen.

10. The rocking bearing according to claim 1, wherein
the predetermined position of said projection part is on a circumferential inner side compared to one of said pockets arranged on a circumferential outermost side, and the movement of said retainer is limited after a part of said retainer projects from the circumferential one end side of said outer ring for the rocking bearing.

11. The rocking bearing according to claim 10, wherein
a circumferential length of the retainer projecting from the outer ring for the rocking bearing is not more than a circumferential length from the one end side of the retainer to said pocket arranged on the circumferential outermost side of the one end side thereof.

12. The rocking bearing according to claim 1, wherein
said click part and said projection part are provided on each axial end.

13. The rocking bearing according to claim 1, wherein
a snap fitting allowable configuration part to allow snap fitting is provided in said retainer and/or said bent part so that said retainer is retained by said bent part after passing through said bent part.

14. The rocking bearing according to claim 13, wherein
said snap fitting allowable configuration includes a fitting click axially projecting from the end face of said connection part.

15. The rocking bearing according to claim 14, wherein
a corner part of said fitting click is chamfered on an outer diameter side.

16. The rocking bearing according to claim 14, wherein
a corner part of said bent part is chamfered on the inner diameter side.

17. The rocking bearing according to claim 14, wherein
said fitting click is provided at a circumferential position provided with said pocket.

18. The rocking bearing according to claim 14, wherein
said fitting click is provided at each connection part, and the circumferential position of the fitting click provided at one connection part is different from the circumferential position of the fitting click provided at the other connection part.

19. The rocking bearing according to claim 13, wherein
said snap fitting allowable configuration is provided at said connection part, and contains a slit recessed in a radial direction.

20. The outer ring for rocking bearing according to claim 19, satisfying a relation:

$$0.2W_2 < W_1 < 0.8W_2$$

wherein $W_1$ represents an axial length of said slit, and $W_2$ represents an axial length of said connection part, and a relation:

$$0.2H_2 < H_1 < 0.8H_2$$

wherein $H_1$ represents an radial length of said slit, and $H_2$ represent an radial length of said connection part.

21. In an air disk brake system including a rocking bearing, the improvement comprising the rocking bearing according to claim 1.

22. A rocking bearing comprising:
an outer ring for the rocking bearing, wherein the outer ring includes a raceway surface on an inner diameter side and a configuration provided by splitting a cylinder member at two circumferential points, the outer ring further comprising a flange part provided by bending each axial each end to the inner diameter side;
a plurality of rollers arranged on said raceway surface; and
a retainer for the rocking bearing having a pair of connection parts extending in a circumferential direction, and a plurality of column parts connecting said pair of connection parts to each other to form a plurality of pockets to hold the rollers between the adjacent column parts, wherein
the radial outermost part of said column part is arranged apart from a pitch circle formed by connecting rotation centers of said rollers, and further wherein
at least one said flange part is provided with a bent part axially bent toward said raceway surface side so as to enfold the retainer arranged on the inner diameter side; and further wherein a projection part is provided at a predetermined position of an axial end face of said connection part, and a click part is provided at said outer ring for the rocking bearing to limit the movement amount of said retainer by abutting on said projection part after said retainer is moved a predetermined amount in a circumferential direction with respect to said outer ring for the rocking bearing, the click part being provided on an inner side of the flange part of the outer ring facing the raceway surface.

23. The rocking bearing according to claim 22, satisfying a relation:

$$B_2 < 0.98 \times B_4$$

wherein $B_2$ represent an outer diameter of said column part, and $B_4$ represents a diameter of said pitch circle.

24. The rocking bearing according to claim 22, satisfying:

$$0.9 < \frac{(n-1) \times l}{L} < 1.0 \qquad \text{[Formula 1]}$$

wherein where n represents the number of rollers housed in said pockets, l represents a length of said pitch circle overlapping with the roller, and L represents a circumferential length of the pitch circle between the rotation centers of the rollers housed in said pockets positioned at circumferential both ends.

25. The rocking bearing according to claim 22, wherein
said retainer for the rocking bearing is formed of a material containing polyamide 46, and 5% to 20% by weight of a fiber filler material.

26. In an air disk brake system including a rocking bearing, the improvement comprising the rocking bearing according to claim 22.

27. A rocking bearing comprising:
an outer ring for the rocking bearing, wherein the outer ring includes a raceway surface on an inner diameter side and a configuration provided by splitting a cylinder member at two circumferential points, the outer ring further comprising a flange part provided by bending each axial each end to the inner diameter side;

a plurality of rollers arranged on said raceway surface; and a pair of connection parts extending in a circumferential direction, and a plurality of column parts connecting said pair of connection parts to form a plurality of pockets to hold the rollers between said adjacent column parts, and satisfying a relation:

$\{\theta/(n-1)\}° < a_0 < 90°$ wherein n represents the number of rollers housed in said pockets, $a_0$ represent an angle formed between opposed wall surfaces of said adjacent column parts, and $\theta$ represents a center angle formed between rotation centers of the rollers housed in said pockets positioned at circumferential both ends; and further wherein at least one said flange part is provided with a bent part axially bent toward said raceway surface side so as to enfold the retainer arranged on the inner diameter side; and further wherein a projection part is provided at a predetermined position of an axial end face of said connection part, and a click part is provided at said outer ring for the rocking bearing to limit the movement amount of said retainer by abutting on said projection part after said retainer is moved a predetermined amount in a circumferential direction with respect to said outer ring for the rocking bearing, the click part being provided on an inner side of the flange part of the outer ring facing the raceway surface.

28. In an air disk brake system including a rocking bearing, the improvement comprising the rocking bearing according to claim 27.

* * * * *